(12) United States Patent
Ikeda et al.

(10) Patent No.: US 12,068,926 B2
(45) Date of Patent: Aug. 20, 2024

(54) DISPLAY CONTROL SYSTEM, DISPLAY METHOD, AND PROGRAM

(71) Applicant: NTT Communications Corporation, Tokyo (JP)

(72) Inventors: Daijiro Ikeda, Yokohama (JP); Daisuke Makino, Tokyo (JP); Yoshiharu Ishiyama, Tokyo (JP); Soichiro Ono, Tokyo (JP); Mami Nakamura, Tokyo (JP); Hitoshi Nakao, Tokyo (JP); Naoya Ishitani, Kawaguchi (JP)

(73) Assignee: NTT COMMUNICATIONS CORPORATION, Tokyo (JP)

( * ) Notice: Subject to any disclaimer, the term of this patent is extended or adjusted under 35 U.S.C. 154(b) by 0 days.

(21) Appl. No.: 17/650,892

(22) Filed: Feb. 14, 2022

(65) Prior Publication Data
US 2022/0166686 A1    May 26, 2022

Related U.S. Application Data

(63) Continuation of application No. PCT/JP2019/037389, filed on Sep. 24, 2019.

(51) Int. Cl.
*H04L 41/22* (2022.01)
*G06F 3/0484* (2022.01)
*H04L 41/12* (2022.01)

(52) U.S. Cl.
CPC ............ *H04L 41/22* (2013.01); *G06F 3/0484* (2013.01); *H04L 41/12* (2013.01)

(58) Field of Classification Search
CPC ........ H04L 41/22; H04L 41/12; G06F 3/0484
See application file for complete search history.

(56) References Cited

U.S. PATENT DOCUMENTS

| | | | | |
|---|---|---|---|---|
| 9,160,630 | B2 * | 10/2015 | Wong | H04L 41/5096 |
| 9,621,428 | B1 * | 4/2017 | Lev | H04L 41/0806 |
| 9,979,780 | B1 * | 5/2018 | Faibish | H04L 67/1097 |
| 10,305,726 | B2 * | 5/2019 | Hasan | H04L 47/70 |

(Continued)

FOREIGN PATENT DOCUMENTS

| | | |
|---|---|---|
| EP | 3240231 | 11/2017 |
| EP | 3240232 | 11/2017 |

(Continued)

OTHER PUBLICATIONS

International Search Report for PCT/JP2019/037389 mailed on Oct. 29, 2019.

(Continued)

*Primary Examiner* — James T Tsai
(74) *Attorney, Agent, or Firm* — IPUSA, PLLC

(57) ABSTRACT

A display control system for displaying a GUI screen on a terminal of a user, the display control system includes: a setting GUI unit, wherein the setting GUI unit is configured to cause the terminal to display a screen depicting a network configuration including a plurality of selectable clouds, and wherein the setting GUI unit is configured to cause the terminal to display a parameter input screen for a connection between a specific cloud and a resource in a case where the specific cloud and the resource to connect to the specific cloud are selected at the terminal.

11 Claims, 34 Drawing Sheets

(56) References Cited

U.S. PATENT DOCUMENTS

| | | | |
|---|---|---|---|
| 10,911,563 B2* | 2/2021 | Woronka | H04L 67/10 |
| 2004/0215481 A1 | 10/2004 | Nishi | |
| 2004/0233234 A1* | 11/2004 | Chaudhry | H04L 41/0895 |
| | | | 715/735 |
| 2007/0233952 A1 | 10/2007 | Tanaka et al. | |
| 2009/0210821 A1 | 8/2009 | Omiya | |
| 2011/0289119 A1* | 11/2011 | Hu | H04L 43/0811 |
| | | | 707/E17.032 |
| 2013/0054634 A1* | 2/2013 | Chakraborty | H04L 67/1091 |
| | | | 709/204 |
| 2013/0086234 A1* | 4/2013 | Salsburg | G06F 9/5072 |
| | | | 709/223 |
| 2014/0006580 A1* | 1/2014 | Raghu | G06F 9/45558 |
| | | | 709/223 |
| 2015/0372857 A1* | 12/2015 | Hasan | G06F 9/5072 |
| | | | 709/220 |
| 2016/0057019 A1* | 2/2016 | Koo | H04L 67/10 |
| | | | 715/736 |
| 2016/0066202 A1* | 3/2016 | Dayanandan | H04W 16/00 |
| | | | 370/252 |
| 2016/0080204 A1* | 3/2016 | Mishra | H04L 41/0853 |
| | | | 709/220 |
| 2016/0197834 A1* | 7/2016 | Luft | H04L 12/46 |
| | | | 709/223 |
| 2016/0308762 A1* | 10/2016 | Teng | H04L 41/5096 |
| 2017/0063614 A1 | 3/2017 | Hartwig | |
| 2017/0078410 A1 | 3/2017 | Rao | |
| 2017/0085446 A1* | 3/2017 | Zhong | H04L 43/0817 |
| 2017/0093645 A1 | 3/2017 | Zhong et al. | |
| 2018/0336571 A1* | 11/2018 | Gilani | H04L 67/10 |
| 2019/0028360 A1* | 1/2019 | Douglas | H04L 41/22 |
| 2019/0187877 A1* | 6/2019 | Scattolin | G06F 8/34 |
| 2019/0268490 A1 | 8/2019 | Sato | |
| 2019/0340190 A1* | 11/2019 | Ganteaume | G10L 15/34 |
| 2022/0398336 A1* | 12/2022 | Wu | G06F 21/83 |
| 2023/0066084 A1 | 3/2023 | Akutsu et al. | |
| 2023/0091954 A1* | 3/2023 | Rommel | G06F 9/4887 |

FOREIGN PATENT DOCUMENTS

| | | |
|---|---|---|
| JP | 2001-022716 | 1/2001 |
| JP | 2008-009712 | 1/2008 |
| JP | 2013-054402 | 3/2013 |
| JP | 2014-154925 | 8/2014 |
| JP | 2017-524290 | 8/2017 |
| JP | 2017-527151 | 9/2017 |
| JP | 2018-092565 | 6/2018 |
| JP | 2019-149134 | 9/2019 |
| WO | 2006/038286 | 4/2006 |
| WO | 2016/052665 | 4/2016 |
| WO | 2016/103421 | 6/2016 |
| WO | 2016/103422 | 6/2016 |

OTHER PUBLICATIONS

Cisco Multicloud Portfolio: Cloud Consume-Design and Deployment Guide for Cisco CloudCenter: Seamless Deployment, Monitoring, and Optimization, Design and Deployment Guide [Online], Cisco, Jun. 2018, [retrieved on Oct. 17, 2019], Internet: <https://www.cisco.com/c/en/us/products/collateral/cloud-systems-management/cloudcenter/guide-c07-740254.pdf>.

Tenant-Scoped Clouds, Avi Technical Reference (v17.2) [Online], Avi Networks, 2018, [retrieved on Oct. 17, 2019], Internet: <https://avinetworks.com/docs/17.2/tenant-scoped-clouds/tenant-scoped-clouds.pdf>.

Getting Started with MongoDB Atlas, [Online], MongoDB, Inc, Sep. 12, 2019, [retrieved on Oct. 15, 2019], Internet: <http://web.archive.org/web/20190912174158/https://docs.atlas.mongodb.com/getting-started/>.

Extended European Search Report issued in the counterpart European Patent Application No. 19946822.4 mailed May 15, 2023.

Office Action in the counterpart Japanese Application No. 2021-548021, mailed Jul. 25, 2023.

Office Action issued in the counterpart Japanese Patent Application No. 2021-548021 mailed May 28, 2024.

\* cited by examiner

FIG.23

TENANT A / AREA VIEW

PORT PURCHASE PROCEDURE (2/2)

LOCATION: NW1
PORT NAME:
BAND FREQUENCY:
STANDARD: ▼VLAN
NUMBER OF REQUIRED VLAN:

| NAME | NUMBER OF AVAILABLE VLAN | STOCK | |
|---|---|---|---|
| ○ SW-A | 1392 | 10G | 1G |
| ○ SW-B | 1456 | 10G | 1G |
| ○ SW-C | 1488 | 10G | 1G |
| ○ SW-D | 1456 | 10G | 1G |

CANCEL | RETURN | CONFIRM

- PORT
- ROUTER
- CONNECTION
- HISTORY
- MONITORING

AREA A — NW1 — FW / NAT — CLOUD A, CLOUD B, CLOUD C, CLOUD D

FIG.34

| RESOURCE NAME ↑↓ | RESOURCE TYPE ↑↓ | RESOURCE ID ↑↓ | LATEST STATUS / EVENT |
|---|---|---|---|
| ..... | Port | ..... | ⊘ |
| ..... | Port | ..... | ⊗ |
| ..... | Port | ..... | ⊘ |
| ..... | Port | ..... | ⊘ |
| ..... | Port | ..... | ⊘ |
| ..... | Port | ..... | ⊘ |
| ..... | Port | ..... | ⊗ |
| ..... | Port | ..... | ⊗ |
| ..... | Port | ..... | ⊖ |
| ..... | Port | ..... | ⊖ |

Dashboard
⊘ NORMAL  ⓘ ALARM  ⊗ ERROR
10 25 50
1 2 3 4 5 > >>

DISPLAY CONTROL SYSTEM, DISPLAY METHOD, AND PROGRAM

CROSS-REFERENCE TO RELATED APPLICATIONS

The present application is a continuation application of International Application No. PCT/JP2019/037389, filed Sep. 24, 2019. The contents of the application are incorporated herein by reference in their entirety.

BACKGROUND OF THE INVENTION

Field of the Invention

The present invention relates to a graphical user interface.

Description of the Related Art

In recent years, cloud services have become widespread, and the use of cloud services has become a prerequisite for construction and operation of corporate systems. Interconnect services for connecting clouds to on-premises environments are also becoming popular.

The use of interconnect services allows users to build a variety of cloud-based networks in accordance with various use cases.

SUMMARY OF THE INVENTION

Conventional interconnect services, however, do not provide a graphical user interface that visually displays a network configuration that includes a number of connectable clouds. Instead, a new application, installation, and the like need to be made using a text-based user interface.

Therefore, in conventional interconnect services, it is not easy to construct a desired connection configuration such as connecting a base and a cloud, and it is a time-consuming task.

The present invention has been made in view of the foregoing and is intended to provide a graphical user interface that enables easy construction of a desired connection configuration in an interconnection.

According to one aspect of the present invention, a display control system for displaying a GUI screen on a terminal of a user, the display control system includes a setting GUI unit, wherein the setting GUI unit is configured to cause the terminal to display a screen depicting a network configuration including a plurality of selectable clouds, and wherein the setting GUI unit is configured to cause the terminal to display a parameter input screen for a connection between a specific cloud and a resource in a case where the specific cloud and the resource to connect to the specific cloud are selected at the terminal, is provided.

According to one aspect of the present invention, a graphical user interface that enables easy construction of a desired connection configuration in an interconnection, can be provided.

BRIEF DESCRIPTION OF THE DRAWINGS

FIG. 23 is a diagram illustrating an example of a screen displayed on the user terminal;

FIG. 34 is a diagram illustrating an example of a screen displayed on the user terminal.

DESCRIPTION OF THE EMBODIMENTS

In the following, embodiments of the present invention will be described with reference to the drawings. The embodiments described below are only an example, and the embodiments to which the present invention is applied are not limited to the following embodiments.

Hereinafter, an interconnect system will be described that can provide a user with optimal connections by allowing users to freely combine and select resources such as ports, connections, and components.

(System Configuration)

Figure 1:
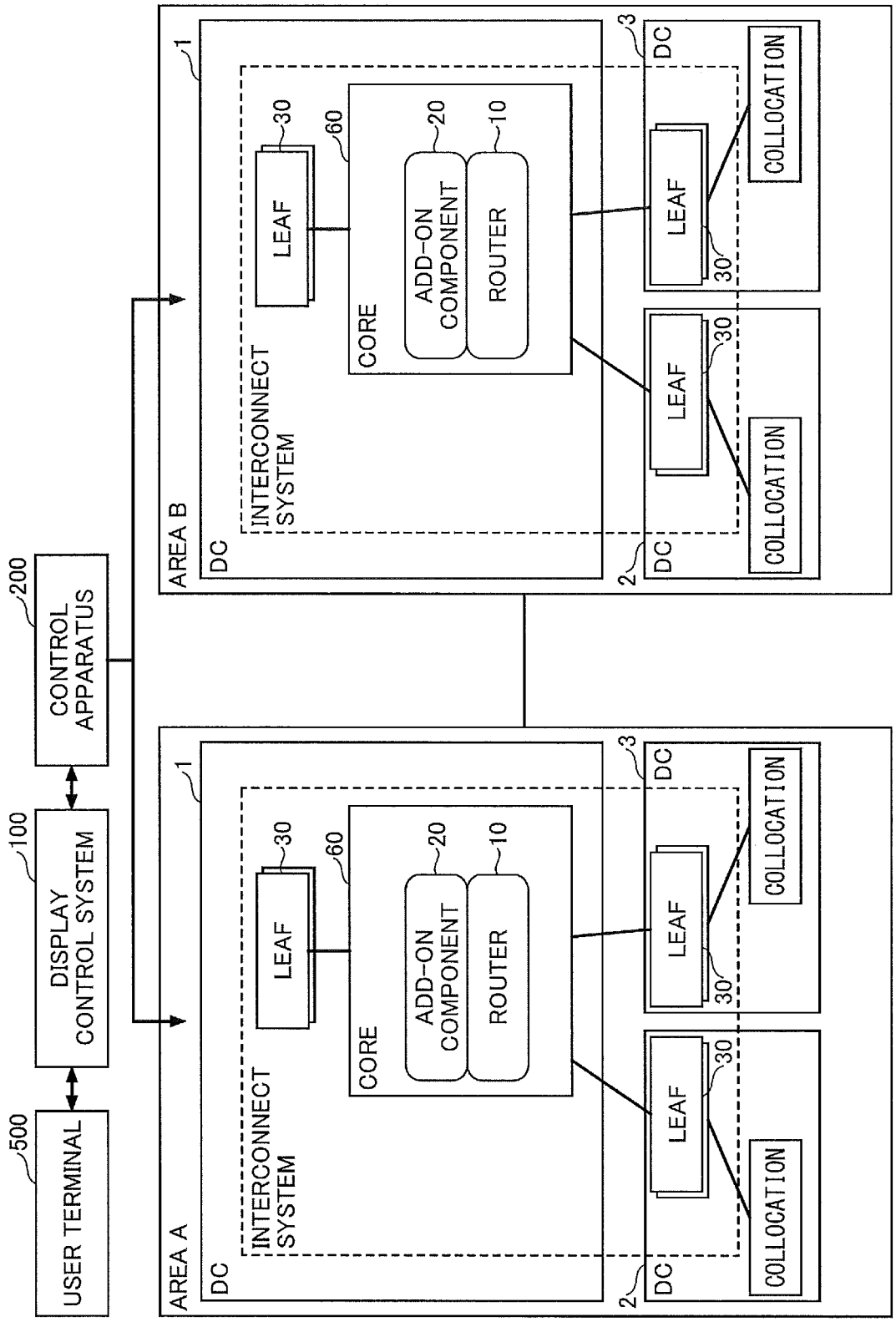
FIG. 1 is a diagram illustrating an example of a connection configuration using an interconnect system according to an embodiment.

FIG. 1 illustrates an overview of an interconnect system according to the present embodiment. In FIG. 1, Area A and Area B are illustrated. The number of the areas is not limited. There may be one area, or may be three or more areas. The area may be a region such as "eastern Japan" or "western Japan", or a region defined by other categories. A region having a connection point to the cloud may be set as the area. As used herein, a "cloud" refers to a cloud service such as AWS (registered trademark), Azure (registered trademark), and Office 365 (registered trademark). A "closed network" is, for example, a VPN service.

In the example of FIG. 1, Area A and Area B are connected by an inter-area network (NW) so that Area A and Area B can communicate with each other.

A system that includes a core 60 and at least one leaf 30, illustrated in each of Area A and Area B, is referred to as an interconnect system. As will be described later in more detail, the core 60 is a functional unit including a router 10, a component 20 such as a firewall (FW), and the like. The leaf 30 is a functional unit including a network device (a router, a switch, and the like) that houses a port.

The leaf 30 and the core 60 are connected by a physical communication line. A virtual private network (VPN), which is a connection, is constructed by setting one or more network devices constituting the leaf 30 and the core 60. The network device (a router, a switch, a server, and the like) used in the present embodiment may be a physical device, or a device implemented by a virtual machine.

The core 60 in the interconnect system is installed in, for example, a data center (hereinafter, DC) 1 of a provider that provides the interconnect system. The leaf 30 is installed in a DC 2 and DC 3, which are DCs of any provider or user, in addition to the DC 1. There is no particular limitation on where to arrange each function that constitutes the interconnect system. The configuration illustrated in FIG. 1 is only an example.

The "collocation" illustrated in FIG. 1 means that a user installs the user's own equipment in a DC provided with the leaf 30 and connects the equipment to the leaf 30. The leaf 30 is connected to a user facility via a physical cable, dedicated lines, closed network service or the like. A cloud is also connected to the leaf 30.

In FIG. 1, a user terminal 500, a display control system 100, and a control apparatus 200 are illustrated. The control apparatus 200 is connected to the display control system 100 that provides a Graphical User Interface (GUI) to the user terminal 500. The setting information (parameters and the like) input from the user terminal 500 via the GUI is transmitted to the display control system 100, and transmitted from the display control system 100 to the control apparatus 200. Based on the setting information, the control apparatus 200 sets one or more network devices that constitute the interconnect system. The control apparatus 200 also sets the cloud to be connected. With these settings, a connection between a router and the cloud is established, for example.

Figure 2:
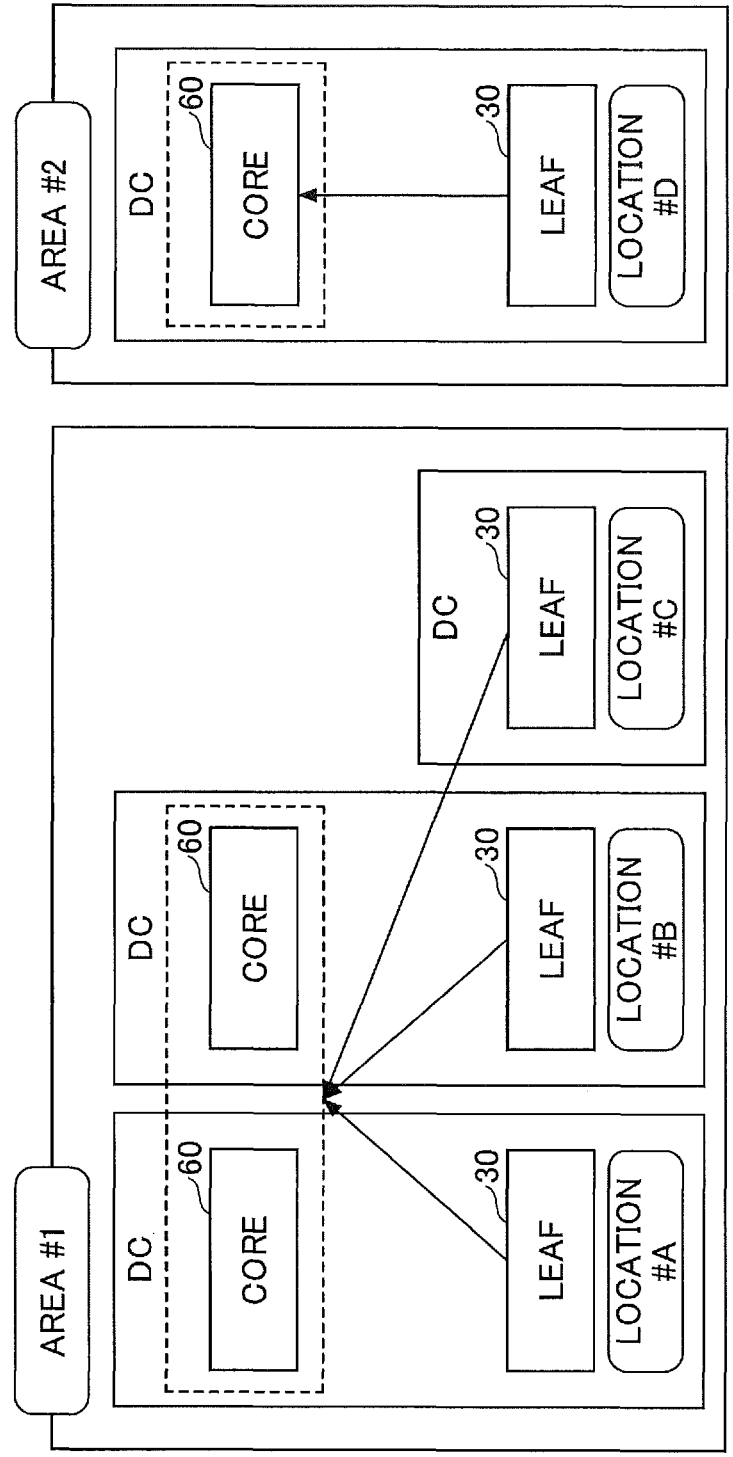
FIG. 2 is a diagram illustrating a relationship between an area and a location.

FIG. 2 is a diagram illustrating a relationship between the core 60, the leaf 30, the area, and a location in the DC. The location is the location where the leaf 30 is located, and is the location (location of the patch panel) of the physically connected device (port). The port is housed in the leaf 30. The core 60 belongs to one area.

As related to the GUI described later, when a plurality of DC having the core 60 exists in the same area, the DCs are indicated as a single unit to the user. When a plurality of locations provided with the leaf 30 exists in the same area, each leaf can connect in the same manner to the core 60 in the area.

Users are presented with menus making the user aware of the area and the location and menus not that do not particularly make the user aware of the core and the leaf. Such display control is performed by the display control system 100 (specifically, a setting GUI unit 110). Note that, this is an example, and the core and the leaf may be displayed explicitly.

The leaf in one area is not connected to the core in the other area. Note that, this is an example, and the leaf in one area may be connected to the core in other area.

Figure 3:
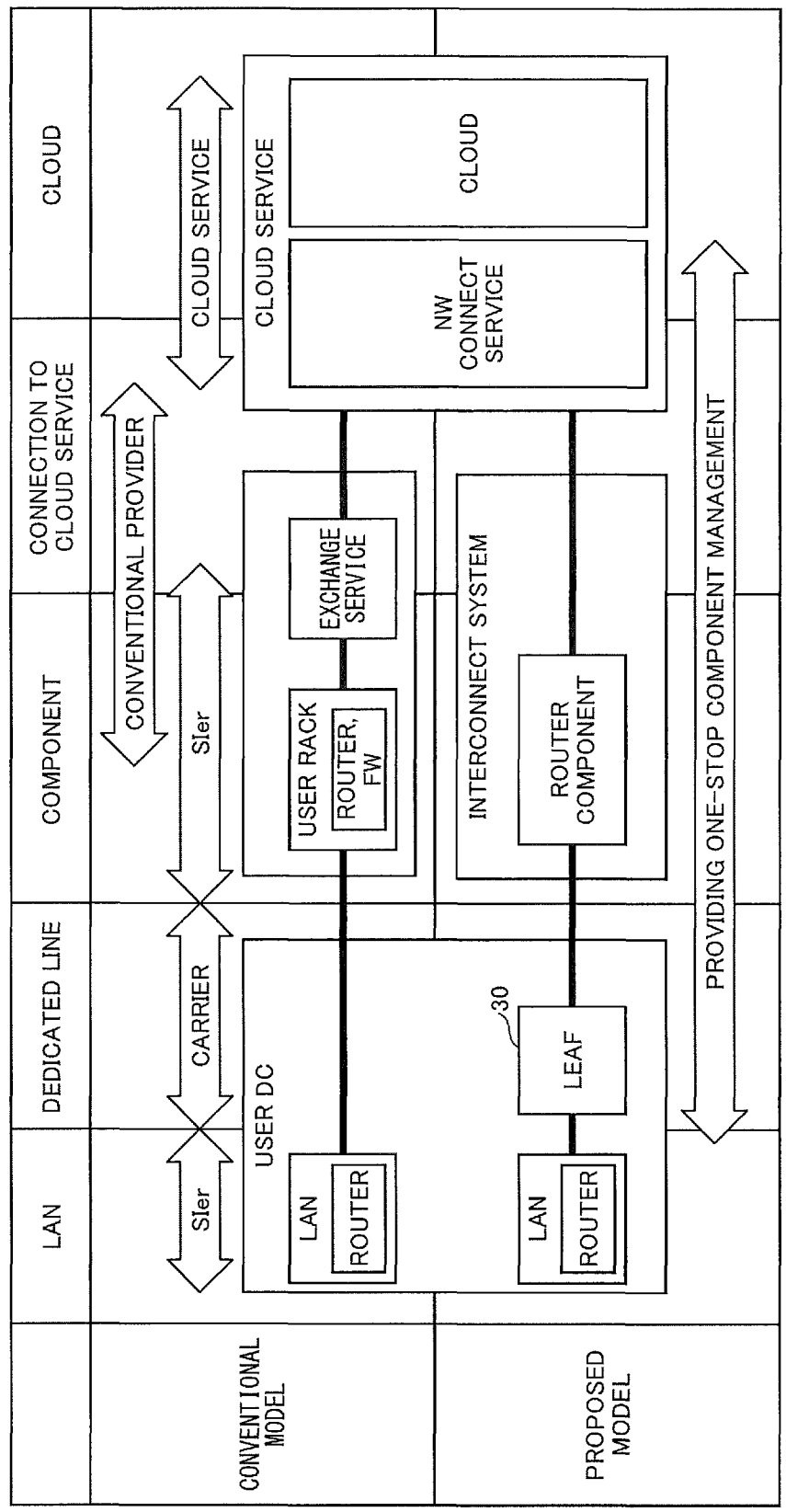
FIG. 3 is a diagram illustrating a comparison between a proposed model and a conventional model.

FIG. 3 is a diagram illustrating a comparison between a conventional interconnect system (a conventional model) and an interconnect system according to the present embodiment (a proposed model).

The conventional model is described in the upper row of the table in FIG. 3. In the conventional model, the user brings and installs the user equipment (a router, a FW, and the like) into a rack provided in the provider's DC. It is necessary for the user to prepare the line to the user equipment installed in the user DC (that is, the DC provided with the user equipment).

On the other hand, in the proposed model, the user can connect the user equipment to the cloud by simply connecting the user equipment to the leaf and then simply purchasing and setting a router component and the like via the GUI.

In the conventional model, the connection from the user equipment to the cloud is only the layer 2 (L2) connection. In other words, control of FW/NAT and the like must be performed using an equipment prepared by the user. On the other hand, in the proposed model, in addition to the L2 connection, the L3 connection can be provided. By using the L3 connection, additions and settings of FW/NAT and the like can be made via the GUI.

(Services and the Like Provided by Interconnect System)

Figure 4:
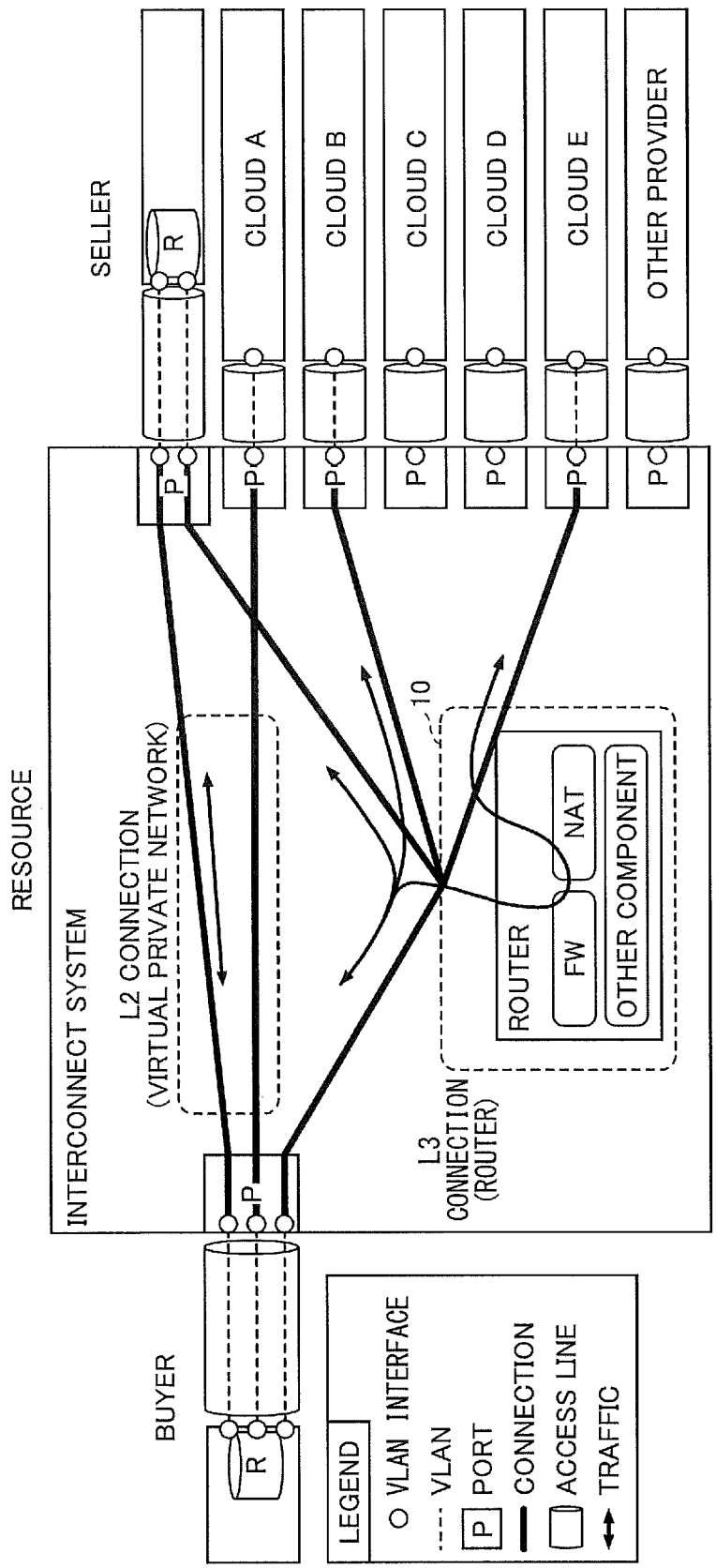
FIG. 4 is a diagram for explaining components of an interconnect system according to the embodiment.

FIG. 4 is a diagram illustrating a functional configuration of the interconnect system (and services provided) in terms of services provided by the interconnect system according to the present embodiment.

Here, "resource" is a function that provides connectivity to users. The resource includes a port (illustrated as "P" in FIG. 4), a router, a connection, and a component.

A "buyer" illustrated in FIG. 4 is a person who utilizes the services provided by the interconnect system according to the present embodiment. A "seller" is a provider of services to the buyer. The provider that provides the aforementioned AWS (Registered Trademark), Azure (Registered Trademark), and Office 365 (Registered Trademark) is an example of the seller.

Although a "user" in the present specification is assumed to be a buyer, a "user" may be a seller. Each of the resources is outlined below.

A port is a resource (physical port) for connecting the user equipment to the interconnect system. For example, a user equipment may be connected to a port by a fiber optic cable, a dedicated line, a closed network, and the like. The user can implement a redundant configuration by purchasing multiple ports.

A connection is a resource that connects ports, or between a port and a router. According to the present embodiment, a connection is implemented as a virtual private network (VPN). In a case where at least one of the start point (src)

and the end point (dst) is a router, the connection is an L3 connection, and in a case where both src and dst are ports, the connection is an L2 connection.

A router is a resource that provides L3 routing function, and is a peer of a BGP connection. A routing group (RG) functions in the router. A connection that has a router in src or dst connects to the routing group. The user can implement a redundant configuration by purchasing multiple routers (paired routers).

The routing group is a virtual router (VRF) included in the router. The connections belonging to the same routing group can communicate with each other. The connections belonging to different routing groups need to be connected via a FW.

A component is a resource that provides an additional function. According to the present embodiment, there are L2 and L3 components. The L2 component is a component for the L2 connection. The L3 component is a FW and NAT that work between routing groups in a router, for example. A component providing an additional function for a port may be used.

A firewall (FW) is a resource having a communication function and a filtering function between the routing groups. A FW is used when the connections belonging to different routing groups communicate with each other, or when applying a rule to a communication between routing groups.

A network address translation (NAT) is a resource having an address translation function. The NAT is required mainly when connecting to SaaS (which operates on Global IP). Specifically, in the case of communication from a user to SaaS, a user-specified address (private IP address) that is set as a transmission source IP address is converted to a global IP address. In the case of communication from SaaS to a user, a global IP address that is set as a destination IP address is converted to a user-specified address (private IP address).

A user can build an end-end (for example, the user equipment to the cloud) connectivity by selecting and purchasing various resources. By changing the combination of the resources, a user can build a simple end-end L2 virtual private network connection, an L3 connection via a router function, or an L3 connection with an additional function.

As illustrated in FIG. 4, an equipment of a user (buyer) and a port are connected by a VLAN in an access line.

On the seller side, a configuration is exemplified in which a NW device, clouds A to E, and other provider are connected. For example, a user can build an L3 connection as illustrated in FIG. 4, by selecting, on the GUI, a port at the user's desired location, a router, and a cloud that the user intends to use. For example, a user can build an L2 connection as illustrated in FIG. 4, by selecting, on the GUI, a port at the user's desired location and a cloud (or a port at the location connecting to the cloud) that the user intends to use.

Figure 5:
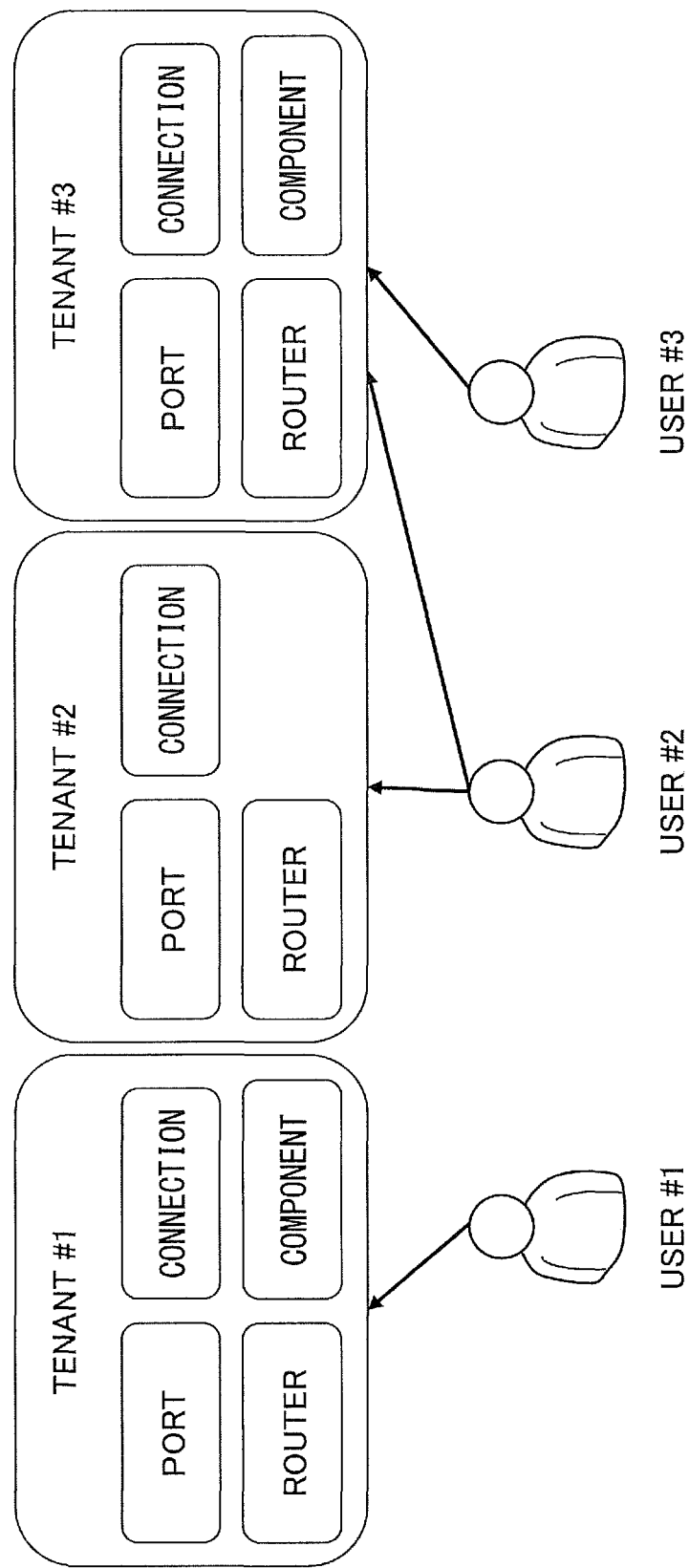
FIG. 5 is a diagram for explaining a method for resource management.

FIG. 5 is a general description of resource management. As illustrated in FIG. 5, resource management is performed in a unit of a tenant and a user. A user may also create multiple tenants for a single contract.

When a user starts using the service, a tenant is first created. A resource is managed on a tenant basis. An access right to a tenant is set for each tenant on a user basis.

Figure 6:
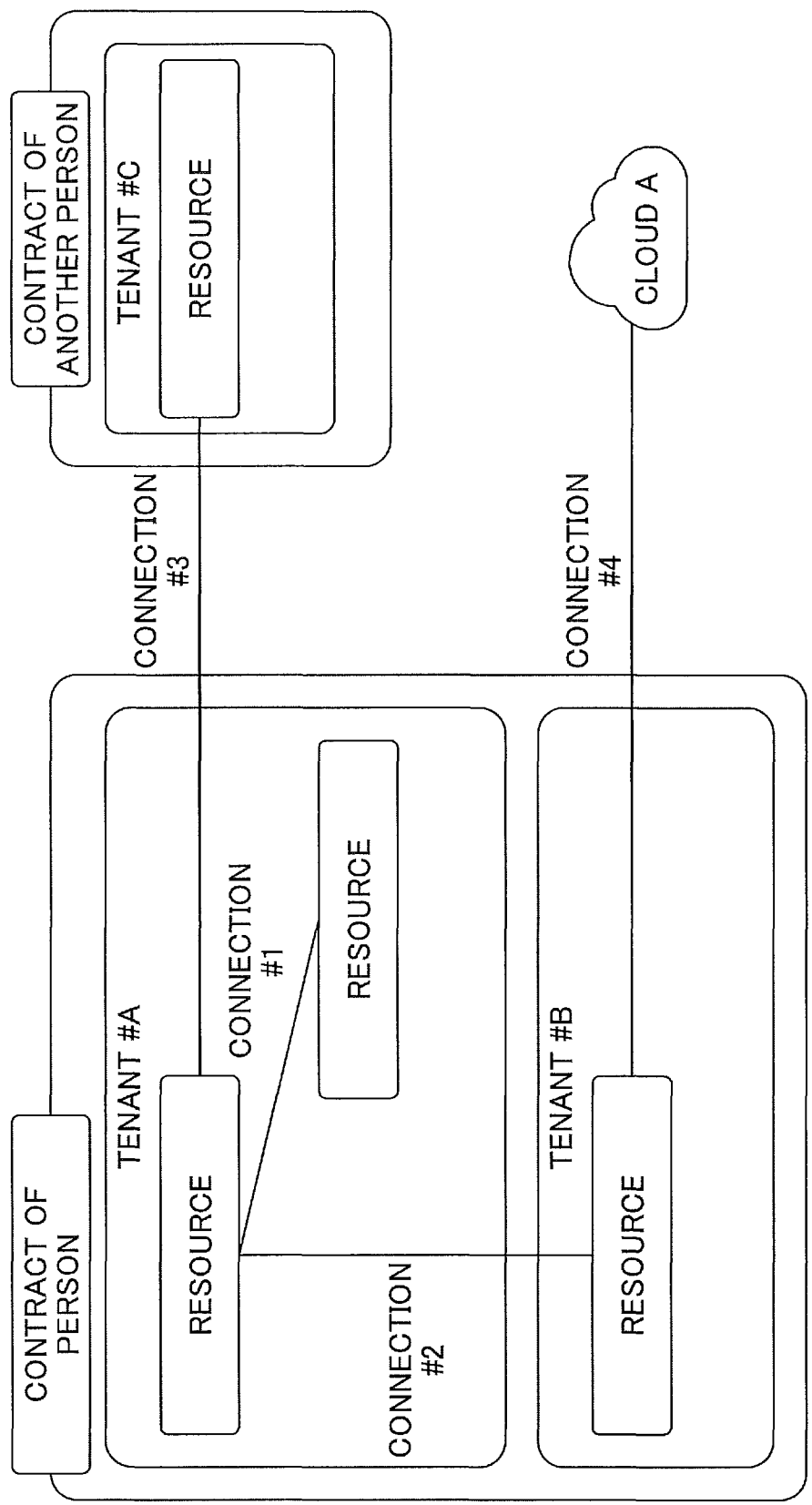
FIG. 6 is a diagram for explaining a connection between resources.

FIG. 6 illustrates connections between resources. The granularity whether or not an approval of connection is required, is a tenant. In the example of FIG. 6, no approval is required for connection to a resource of the same tenant (for example, connection #1). An approval is required for connection to a resource of the different tenant (for example connection #2). An approval is required for connection to a resource of the different contractor (for example connection #3). For connection to a cloud such as connection #4, an approval is required for each cloud. Each resource is described in more detail below.

(Port)

A user purchases a port by specifying an area and a location via a GUI screen. When a new port is purchased, a Letter of Authorization (LOA) is issued to the user. The LOA describes information about connection location of the port. The user notifies the NW provider of the information so that the user equipment is connected (wired) to the port.

After wiring is completed, the port is activated by the user's operation via the GUI screen (Specifically, the port changes from "Shut" to "Not Shut"). When the port is activated, packets can be passed through the port, and the user begins being charged.

The user can retrieve VLANs in a unit of 16, via the GUI screen. The number of VLANs acquired is the number of connections that can be connected from the port.

When the user specifies the port as src of the connection via the GUI screen, the user selects from the VLAN range the VLAN-ID to be set for the connection. A VLAN interface is thus created in the interconnect system. When the user specifies the port as dst of the connection, the user enters the connection destination VLAN information (VLAN-ID, and the like), which is previously obtained, via the GUI. The band frequency of the port is, for example, 1G or 10G, and is selectable. The user can select the selected port type (0 series, 1 series, and the like) via the GUI screen.

Figure 7:
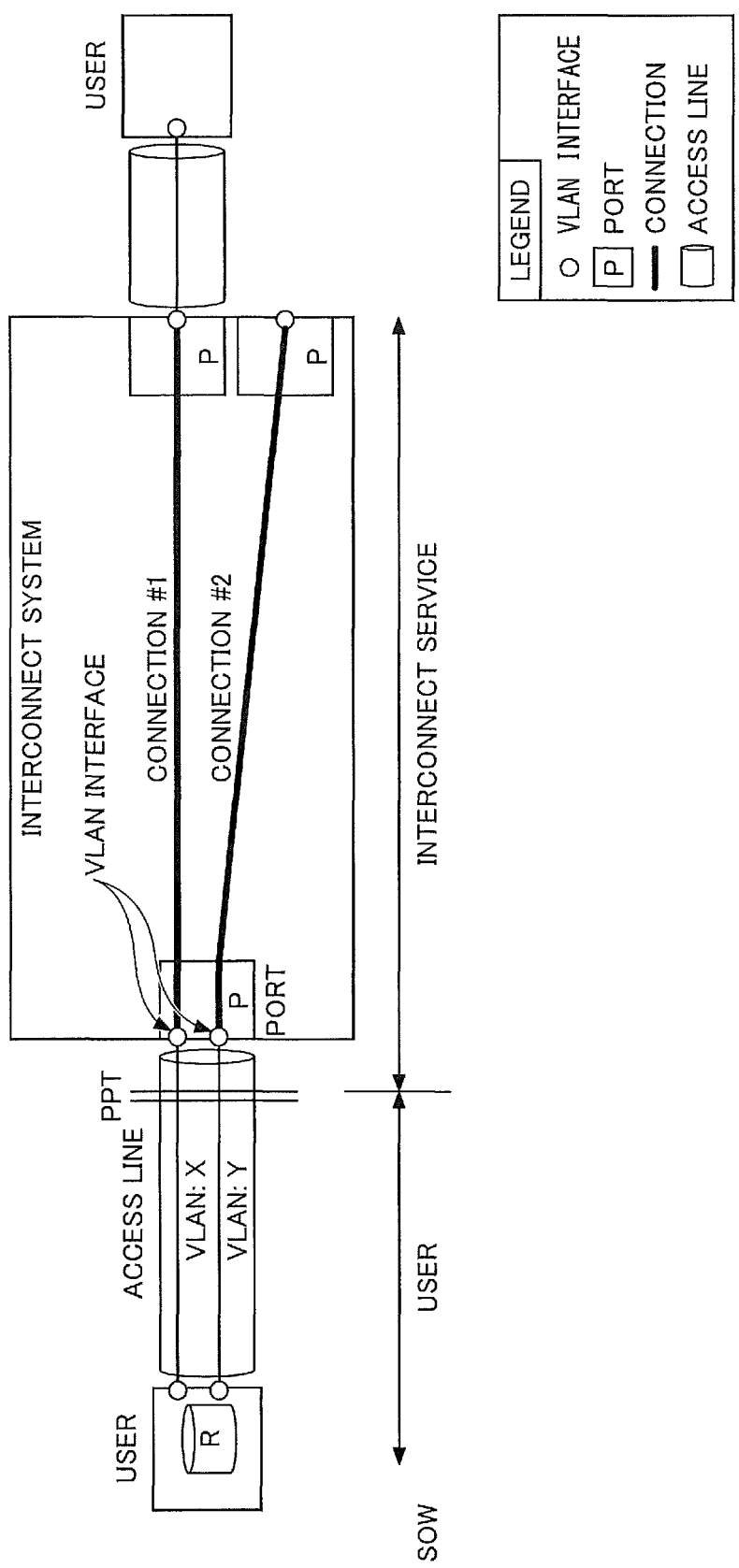
FIG. 7 is a diagram illustrating a connection example.

FIG. 7 illustrates an example where the ports are used. In the example of FIG. 7, connections between one port of src (or dst) and two ports of dst (or src) are established. Connection #1 is established for VLAN: x, and connection #2 is established for VLAN: y.

(Router)

Figure 8:
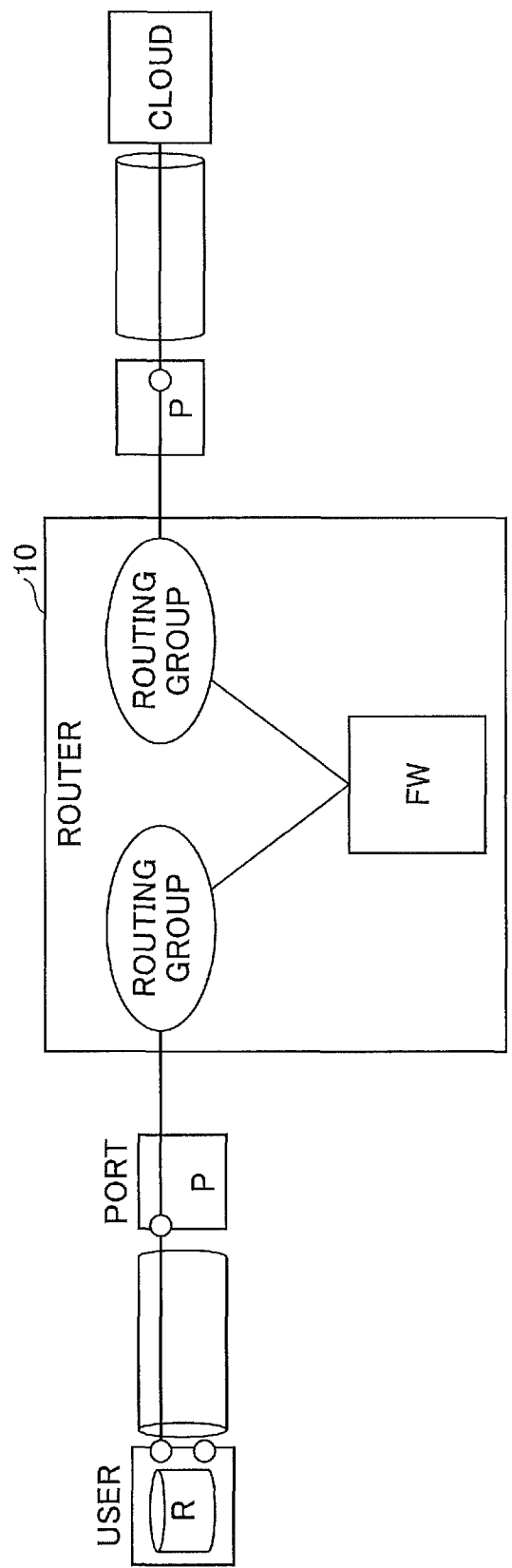
FIG. 8 is a diagram for explaining routing groups.

The user purchases a router by specifying an area. In the present embodiment, when a user purchases a router, eight routing groups are created. FIG. 8 is a general description when a routing group is used. FIG. 8 illustrates an example of a FW (firewall) placed between routing groups.

The communication of FIG. 8 can also be implemented by replacing the routing groups of FIG. with routers. That is, the configuration illustrated in FIG. 8 is substantially the same as the router-FW-router configuration. By using the routing groups in the manner illustrated in FIG. 8, the user recognizes as if it is a configuration inside the router.

The user specifies a router as src or dst of the connection via the GUI screen. At this time, the user specifies which routing group the connection belongs to from among the multiple routing groups of the router.

If the router is specified as src or dst of the connection, the connection is configured as an L3 connection. An interface is created for each connection, and an Ipv4 or Ipv6 address is assigned to the interface. Routing is set for each connection. the routing is BGP or static.

(Connection)

As previously described, when a port is specified for both src/dst, the connection is an L2 connection. When a router is specified for either or both src/dst, the connection is an L3 connection.

When a user selects a provider for a cloud and the like as dst of the connection, the port that connects to the provider is selected, and the connection between src and the selected port is established. In other words, a user can establish a connection to a cloud by simply selecting the cloud without being aware of the connection point to the cloud, which may differ from one cloud to another.

In the present embodiment, a user is able to select via the GUI screen either a single connection, or a paired connection, which is a set of two connections.

Figure 9:
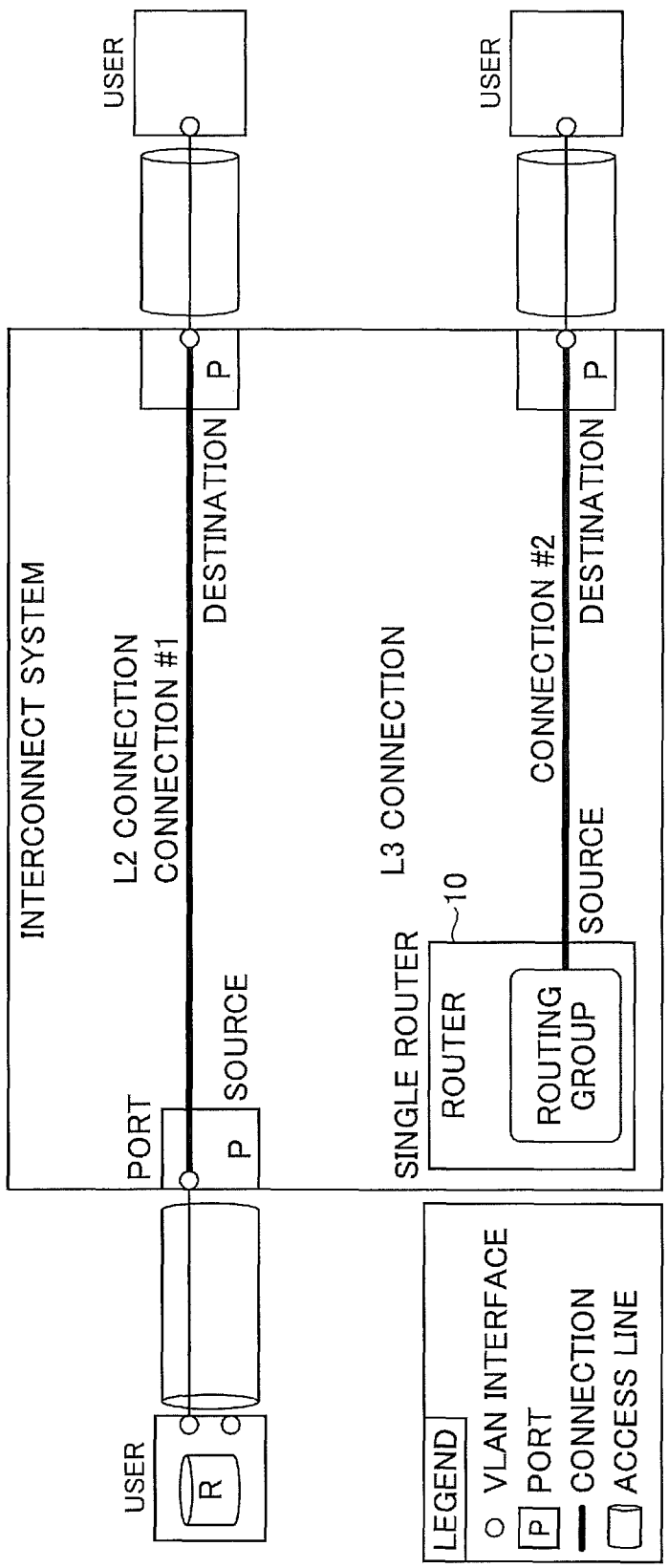
FIG. 9 is a diagram illustrating a connection example.
Figure 10:
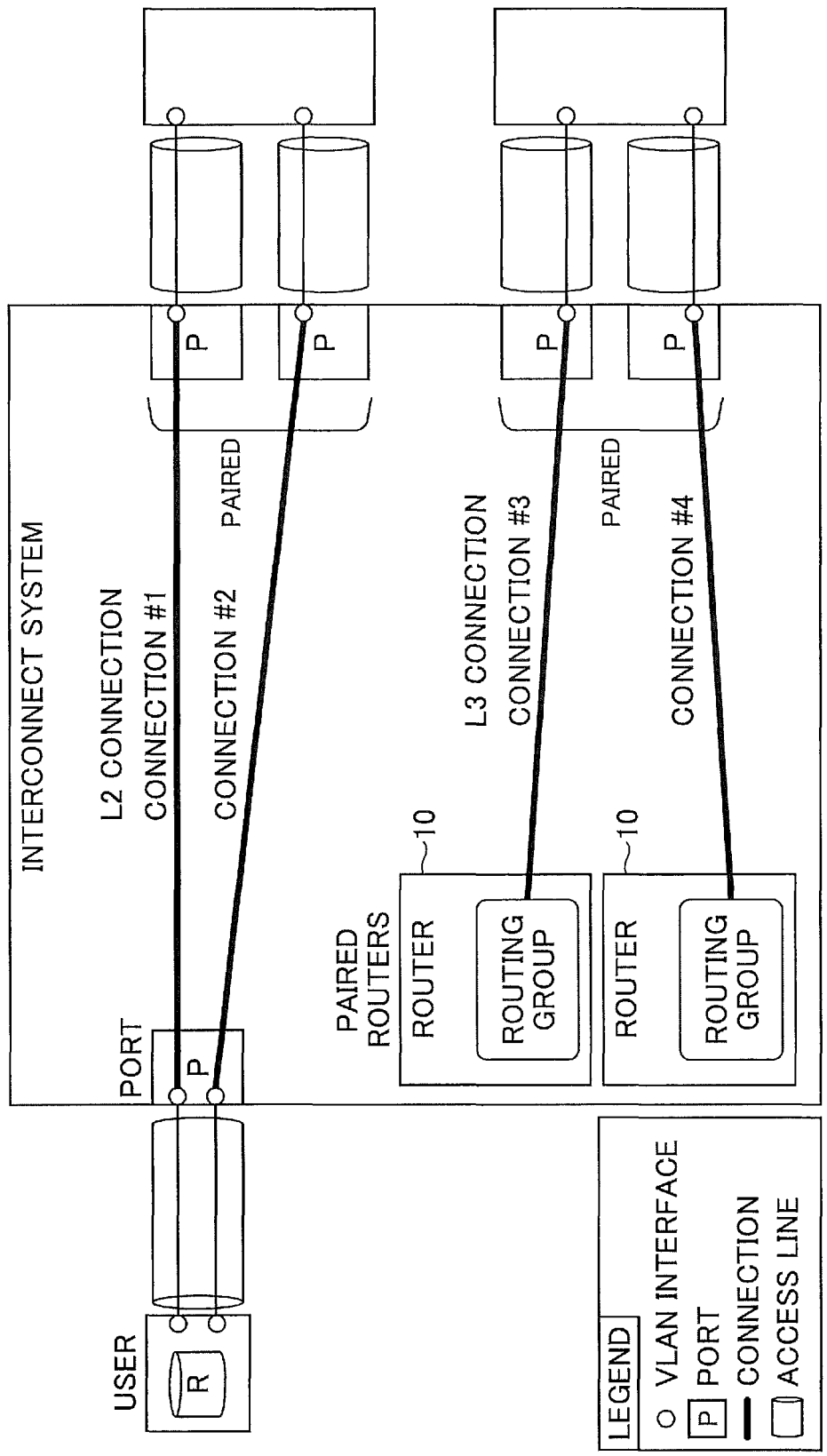
FIG. 10 is a diagram illustrating a connection example.

FIG. 9 illustrates examples of a single connection between ports and a single connection between a router and a port. FIG. 10 illustrates examples of a paired connection between ports and a paired connection between routers and ports.

In the paired connection, the same parameters basically apply to both connections. In the paired connection, two connections are controlled as a set when a two-line redundant configuration is used via a FW or a NAT.

When the L3 connection is used, routing is set for each connection. In the setting, a route of 4 byte-AS is made to be receivable, and MED/AS-PATH prepend (in/out) and a route filter (in/out) are set. In the out-side setting, a route advertisement is changed to only a default route/summarized route, and in the in-side setting, a route reception is changed to only a default route.

Figure 11:
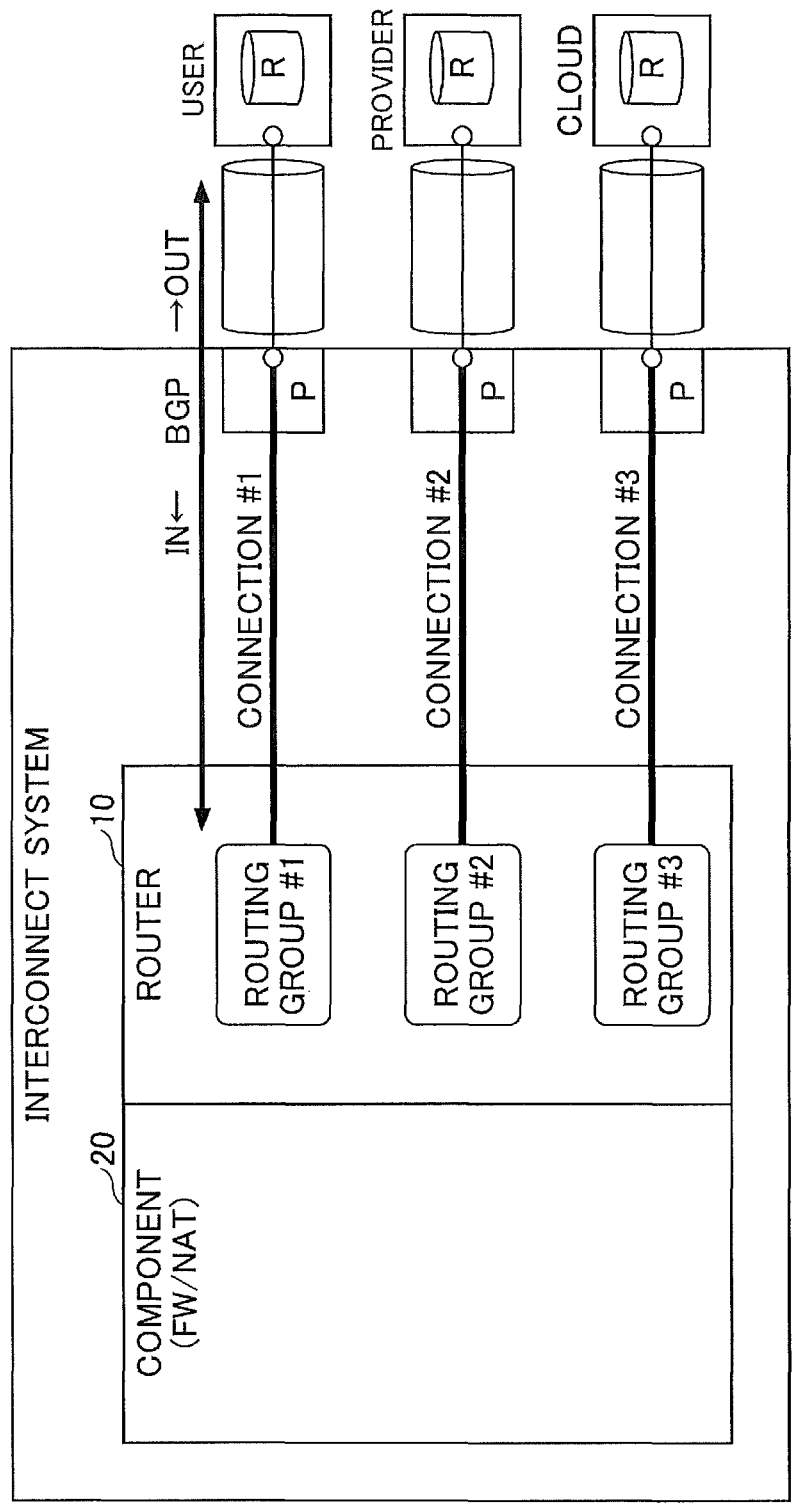
FIG. 11 is a diagram for explaining "in" and "out"

As illustrated in FIG. 11, "out" is a route advertisement from the interconnect system to the outside, and "in" is a route reception from the outside to the interconnect system.
(FW)

FW of the L3 component will be described. A FW is a component that can be used with a router as a set. FW is used to connect different routing groups. FW can be used in combination with NAT.

An application (TCP/UDP port number) and an IP address can be specified as a rule for a traffic matching condition in FW communication policy. The policy is sequential, and the FW evaluates a traffic sequentially from the top of the list. When the traffic matches the condition of either policy, FW does not evaluate any subsequent rules. FW discards any communication that is not permitted in the policy. The minimum policy unit is an address-set. Multiple address-sets can be set in a group.

Figure 12:
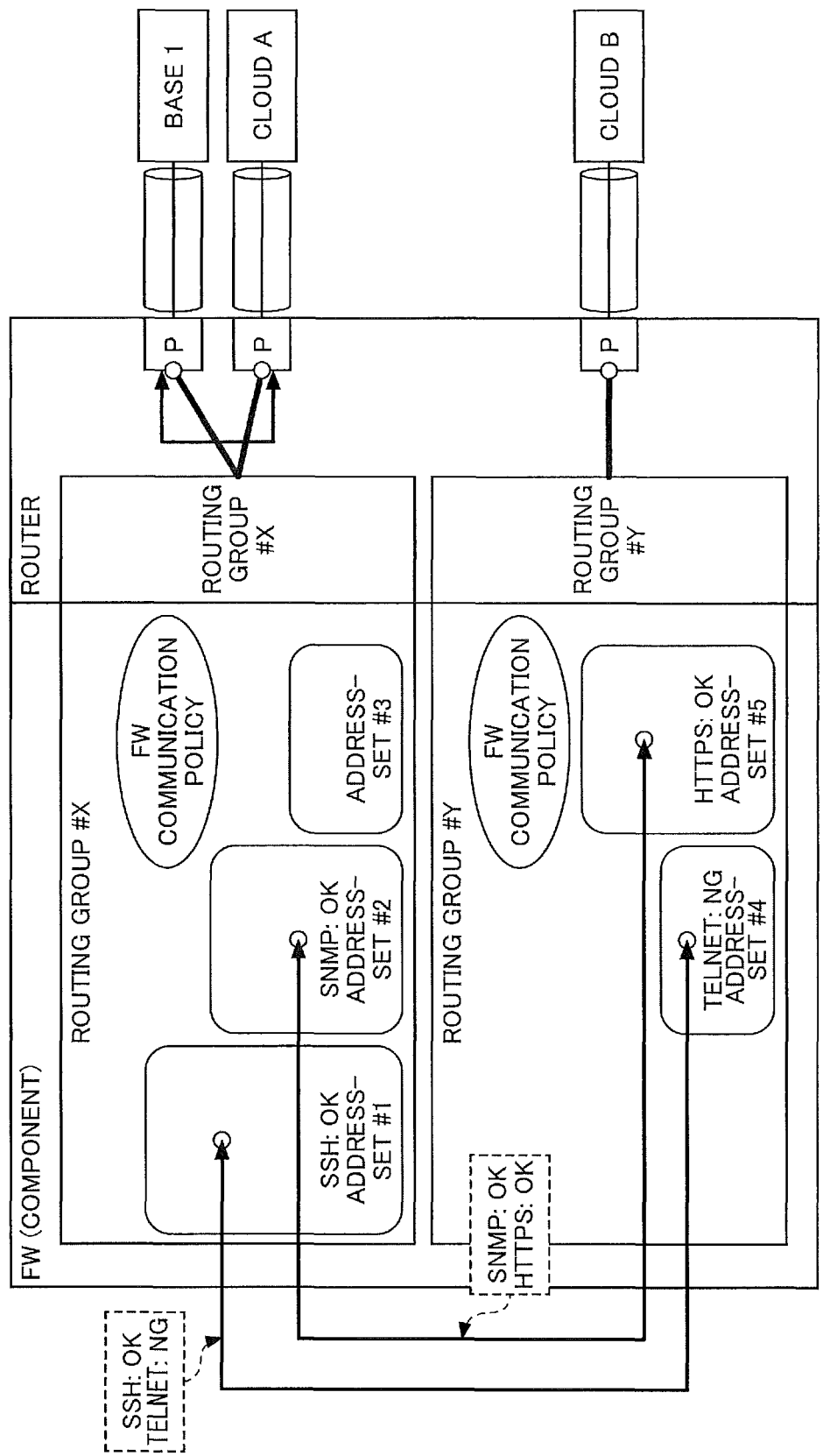
FIG. 12 is a diagram illustrating an example of FW setting.

FIG. 12 illustrates an example of a communication policy in FW. In the example of FIG. 12, the connection connected to base 1 belongs to routing group #X, and the connection connected to Cloud B belongs to routing group #Y. In FIG. 12, a policy is illustrated in which SSH to address-set #1 is allowed (OK) and Telnet to address-set #4 is not allowed (NG), for example.
(NAT)

Next, NAT will be described. NAT is a component that can be used with a router as a set. NAT can be used in combination with FW. A NAT rule is applied between routing groups. Three types of target protocols, namely TCP/UDP/ICMP, are provided.

Figure 13:
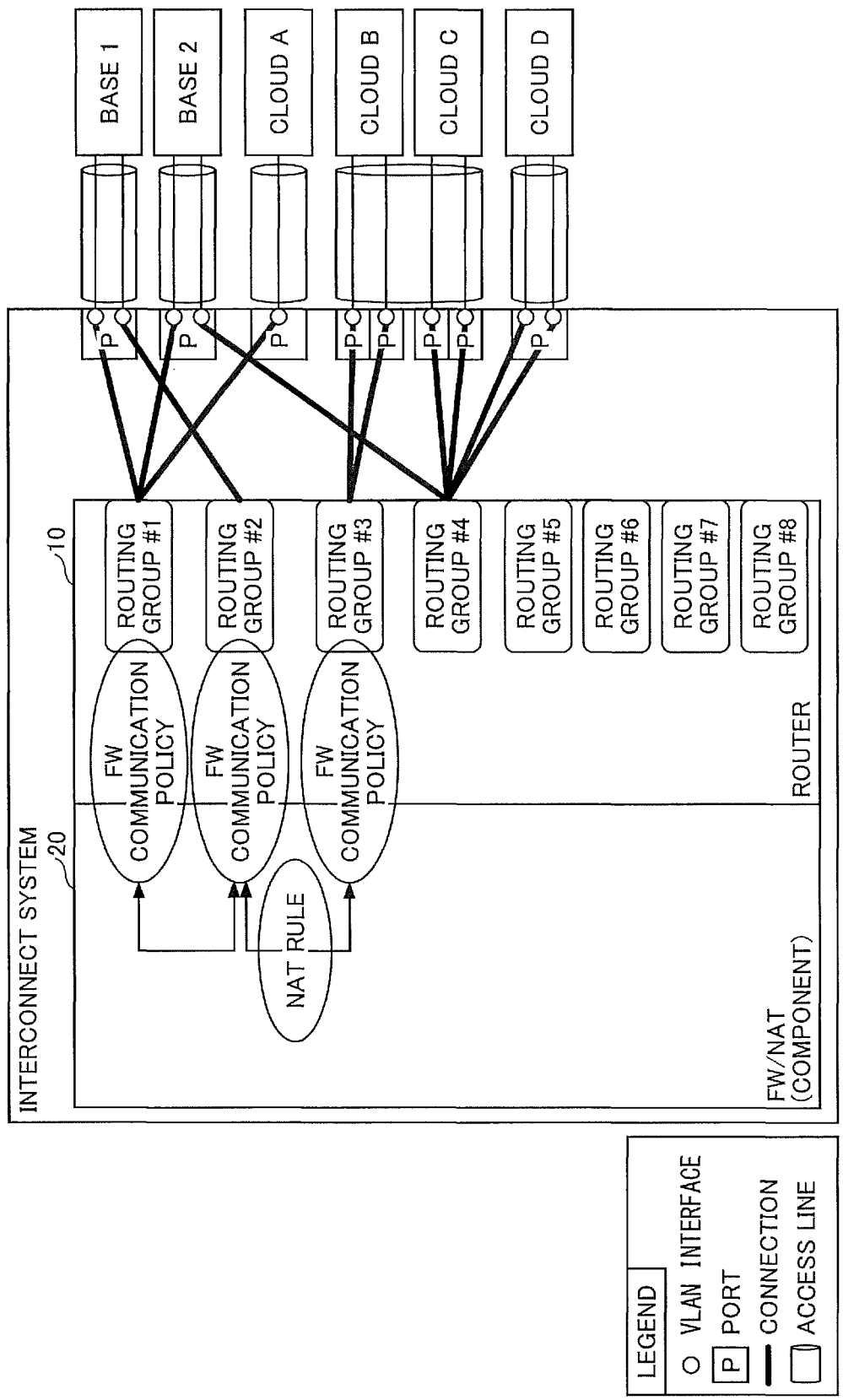
FIG. 13 is a diagram illustrating an example of NAT setting.

NAT has a NAPT function that converts a private IP address to a global IP address and a NAT function that converts a global IP address to a private IP address. FIG. 13 illustrates an example where a NAT rule is applied between routing groups.
(Operation System)

Figure 14:
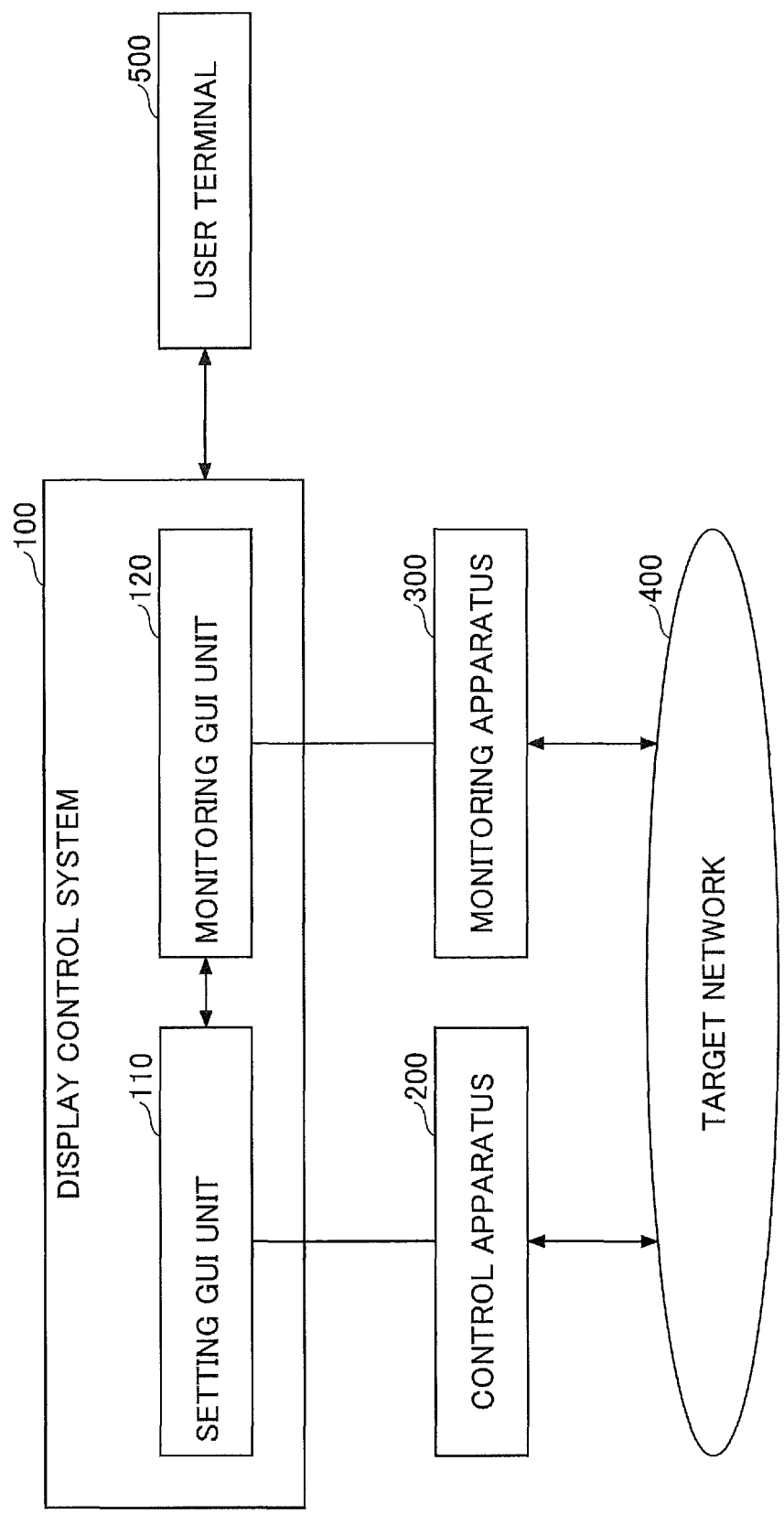
FIG. 14 is a diagram illustrating a configuration example of an operation system.

FIG. 14 is a diagram illustrating a configuration example of an operation system according to the present embodiment. The operation system according to the present embodiment includes a display control system 100, a control apparatus 200, and a monitoring apparatus 300.

A target network 400 includes a network device for implementing a port, a connection, a router, and the like described above. The target network 400 is a target of setting and monitoring. The target network 400 includes an interconnect system according to the present embodiment. The target network 400 includes one or more network devices. A system having an interconnect system and the control apparatus 200 may be referred to as a network system.

Regarding settings from the control apparatus 200 to the target network 400, in the L3 connection, settings of the network device on the route of the L3 connection in the interconnect system is at least performed, and in the L2 connection, settings of the network device on the route of the L2 connection in the interconnect system is at least performed. The settings of the network device to build the L2/L3 connection may be performed using an existing technique. When connecting to a cloud, settings from the control apparatus 200 to the cloud may be performed, using an existing technique. When constructing a router, FW, NAT, and the like, settings may be performed using an existing technique.

The user terminal 500 is, for example, a terminal operated by a user via a GUI screen to set a port, a connection, a router, or the like. "Set" is a general term for such as adding, changing, and discontinuing a resource.

The display control system 100 transmits information of the GUI screen to the user terminal 500 and causes the user terminal 500 to display the GUI screen. Note that, "transmitting information of the GUI screen to the user terminal 500 and causing the user terminal 500 to display the GUI screen" may also be represented as "displaying the GUI screen on the user terminal 500". The display control system 100 receives from the user terminal 500 the information input to the user terminal 500 via the GUI screen, and performs processing based on the received information.

The display control system 100 includes a setting GUI unit 110 and a monitoring GUI unit 120. The setting GUI unit 110 displays the GUI screen on the user terminal 500 for performing the setting of adding, changing, or discontinuing a resource such as a port, a connection, or a router, receives from the user terminal 500 the information input to the user terminal 500 via the GUI screen, and performs processing based on the received information.

The monitoring GUI unit 120 displays on the user terminal 500 a GUI screen for confirming traffic or normality in a resource set by a user, receives from the user terminal 500 the information input to the user terminal 500 via the GUI screen, and performs processing based on the received information.

The setting GUI unit 110 and the monitoring GUI unit 120 are linked. For example, when the user selects "monitoring" on the GUI screen displayed on the user terminal 500 by the setting GUI unit 110, the GUI screen for monitoring is displayed on the user terminal 500 by the monitoring GUI unit 120.

The control apparatus 200 includes a management database for storing configuration information (area information in the target network 400, location information, equipment information in each area and each location, and the like) and setting information indicating the setting of each user (a type of resources used by the user), and the like. The control apparatus 200 receives the information input via the GUI screen for setting, from the setting GUI unit 110. Based on the received information, the control apparatus 200 sets a port, a connection, a router, a cloud, and the like. The setting GUI unit 110 may include the above-described management database.

The monitoring apparatus 300 receives information from the control apparatus 200. Thus, the monitoring apparatus 300 includes a management database that is substantially the same as the management database of the control apparatus 200. Alternatively, the monitoring apparatus 300 may be accessible to the management database of the control apparatus 200. Also, the monitoring apparatus 300 includes a monitoring database. For example, the monitoring apparatus 300 periodically collects monitoring information from each NW device based on the configuration information in the management database, and stores the collected information in the monitoring database. The monitoring information is, for example, traffic, flow information, alarm information, and the like. The monitoring GUI unit 120 may include the above-described management database. The monitoring GUI unit 120 may include the above-described monitoring database.

For example, the monitoring GUI unit 120 acquires the monitoring information corresponding to the resource of the specific user from the monitoring database of the monitoring apparatus 300, based on the setting information for the resource of the specific user. The monitoring GUI unit 120 creates the GUI screen, and displays the GUI screen on the user terminal 500.

The display control system 100 may include one or more devices each having the setting GUI unit 110 and the monitoring GUI unit 120. The display control system 100 may include one or more devices having the setting GUI unit 110 and one or more devices having the monitoring GUI unit 120 separately. These devices may be physical machines or virtual machines. When the setting GUI unit 110 and the monitoring GUI unit 120 are provided separately as devices, they may be referred to as a setting GUI device and a monitoring GUI device. The display control system 100 may be a device having only the setting GUI unit 110.

The control apparatus 200 and the monitoring apparatus 300 may each be a physical machine or a virtual machine. The control apparatus 200 and the monitoring apparatus 300 may be one integrated apparatus.

The display control system 100, the control apparatus 200, the monitoring apparatus 300, the setting GUI device, and the monitoring GUI device may all be implemented, for example, by executing a program on a computer.

Figure 15:
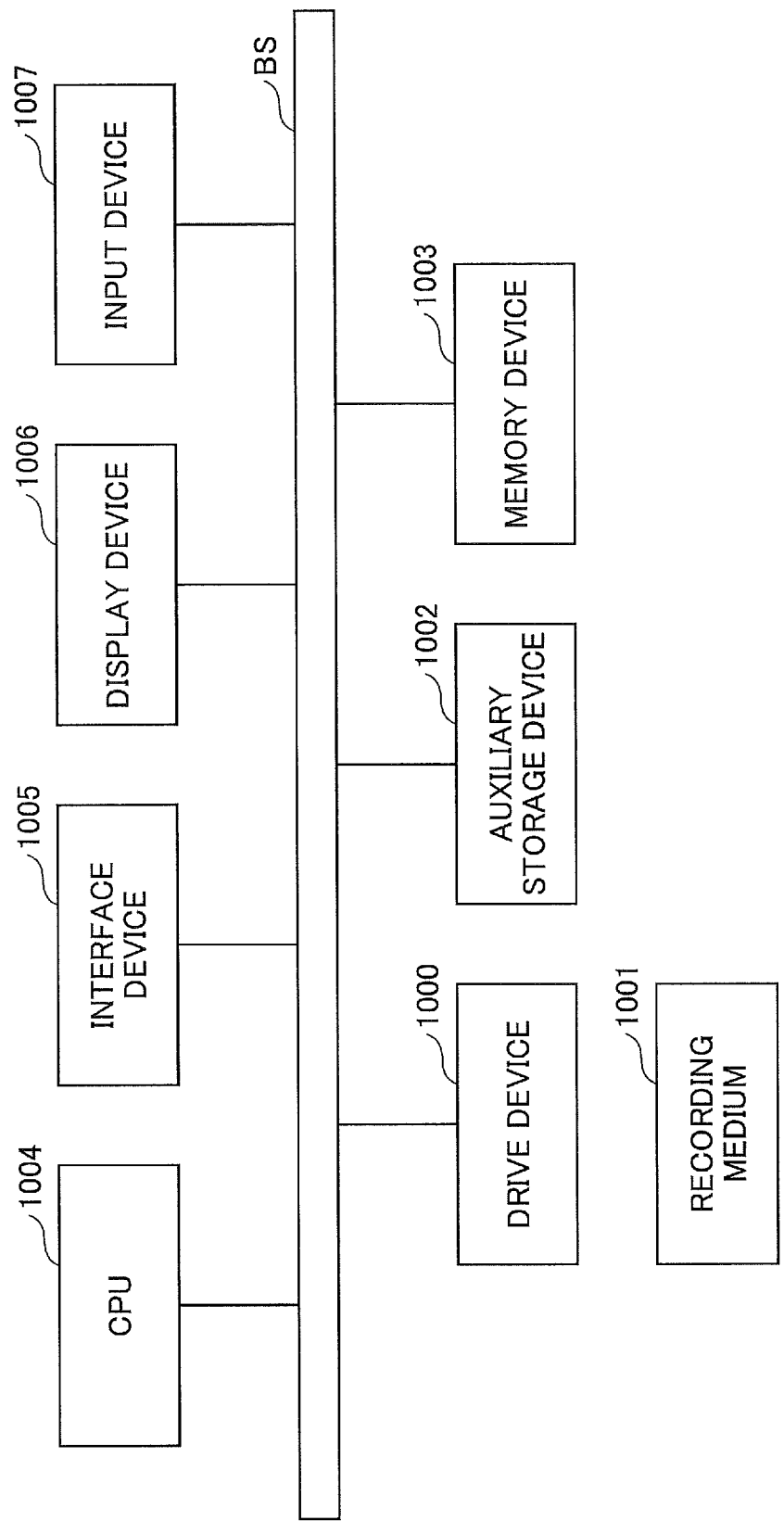
FIG. 15 is a diagram illustrating a hardware configuration example of an apparatus.

FIG. 15 is a diagram illustrating a hardware configuration example of the computer according to the present embodiment. When the computer is a virtual machine, the hardware configuration is a virtual hardware configuration. The computer according to FIG. 15 includes a drive device 1000, an auxiliary storage device 1002, a memory device 1003, a CPU 1004, an interface device 1005, a display device 1006, an input device 1007, and the like, each of which is interconnected with a bus B.

A program for implementing processing by the computer is provided by a recording medium 1001, such as a CD-ROM or a memory card. When the recording medium 1001 on which the program is stored is set in the drive device 1000, the program is installed in the auxiliary storage device 1002 from the recording medium 1001 via the drive device 1000. The program need not necessarily be installed from the recording medium 1001, and the program may be downloaded from another computer via the network. The auxiliary storage device 1002 stores the installed program, and stores necessary files, data, and the like.

The memory device 1003 reads out and stores the program from the auxiliary storage device 1002 upon instruction to start the program. The CPU 1004 implements the function of the appropriate device according to the program stored in the memory device 1003. Interface device 1005 is used as an interface for connecting to a network. The display device 1006 displays a Graphical User Interface (GUI) and the like according to the program. The input device 1007 includes a keyboard, a mouse, buttons, a touch panel, and the like. The input device 1007 is used to input various operating instructions.

(Sequence Example)

Figure 16:
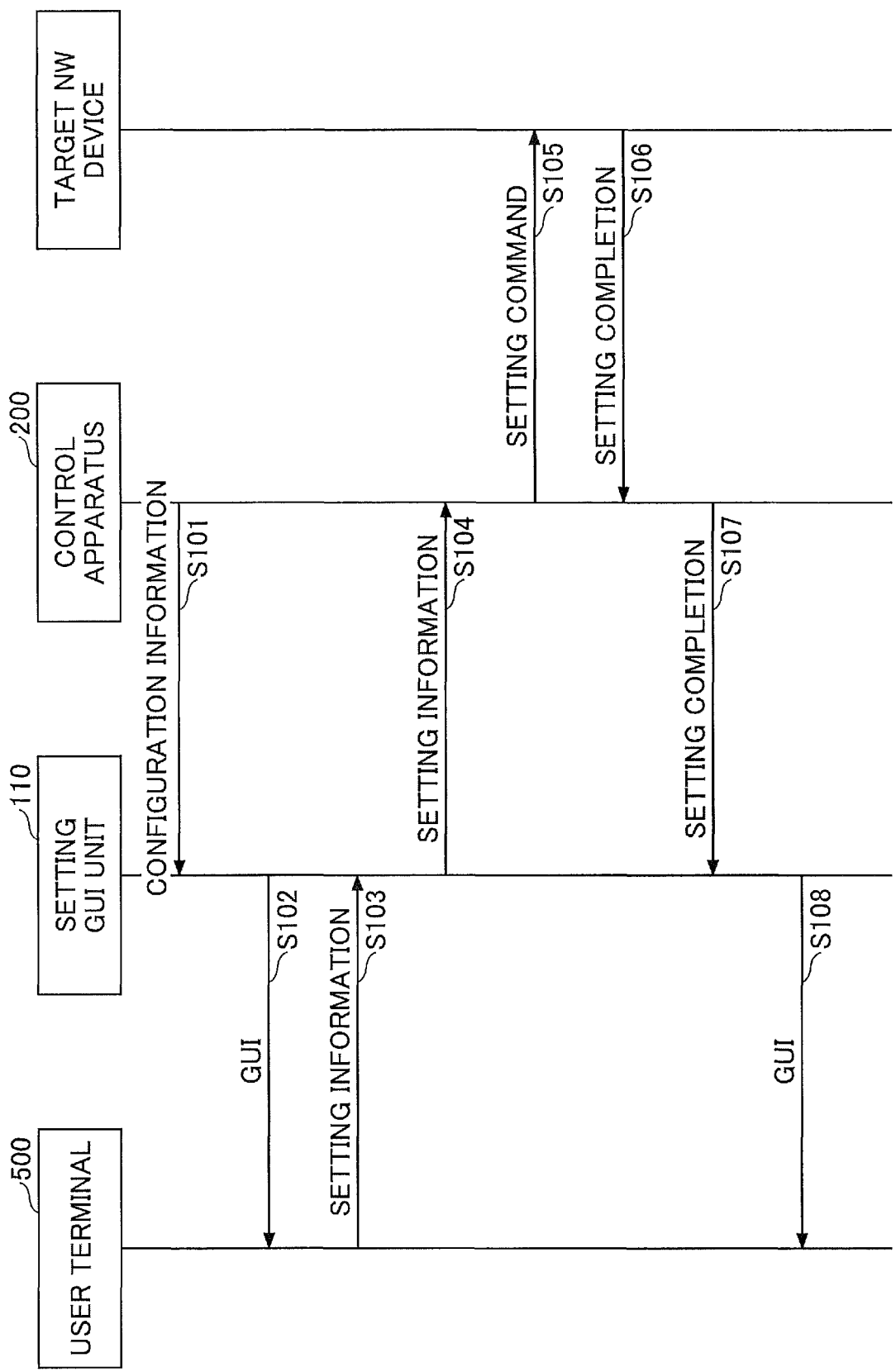
FIG. 16 is a diagram illustrating a flow of a basic process of setting.

FIG. 16 illustrates a sequence in which a user sets resources such as a port, a connection, a router, and the like. The sequence will be described below. Examples of GUI screens are described later. The sequence illustrated in FIG. 16 (and FIG. 17) is an example.

In S101, the setting GUI unit 110 acquires configuration information from the management database of the control apparatus 200. In S102, the setting GUI unit 110 creates the information of the GUI screen based on the configuration information and transmits the information to the user terminal 500. The user terminal 500 displays, for example, a GUI screen depicting a network configuration connecting a plurality of clouds and an area.

When the user selects and purchases a desired resource via the GUI screen by operating the user terminal 500 and inputs setting information (parameters), for example, the setting information is transmitted to the setting GUI unit 110 in S103.

In S104, the setting GUI unit 110 transmits the setting information to the control apparatus 200. In S105, the control apparatus 200 generates a setting command for a target NW device corresponding to the selected resource based on the setting information, and transmits the setting command to the target NW device.

When the setting of the target NW device is completed, the setting completion is returned to the control apparatus 200 in S106. When the control apparatus 200 receives the setting completion, the control apparatus 200 records information indicating the setting completion as the information of the device in the management database.

In S107, the setting completion is transmitted to the setting GUI unit 110. When the setting GUI unit 110 receives the setting completion, the setting GUI unit 110 creates a GUI screen indicating the setting completion of the resource. The setting GUI unit 110 displays the GUI screen on the user terminal 500 in S108. The GUI screen indicating the setting completion of the resource may be displayed upon a request from the user terminal 500.

Figure 17:
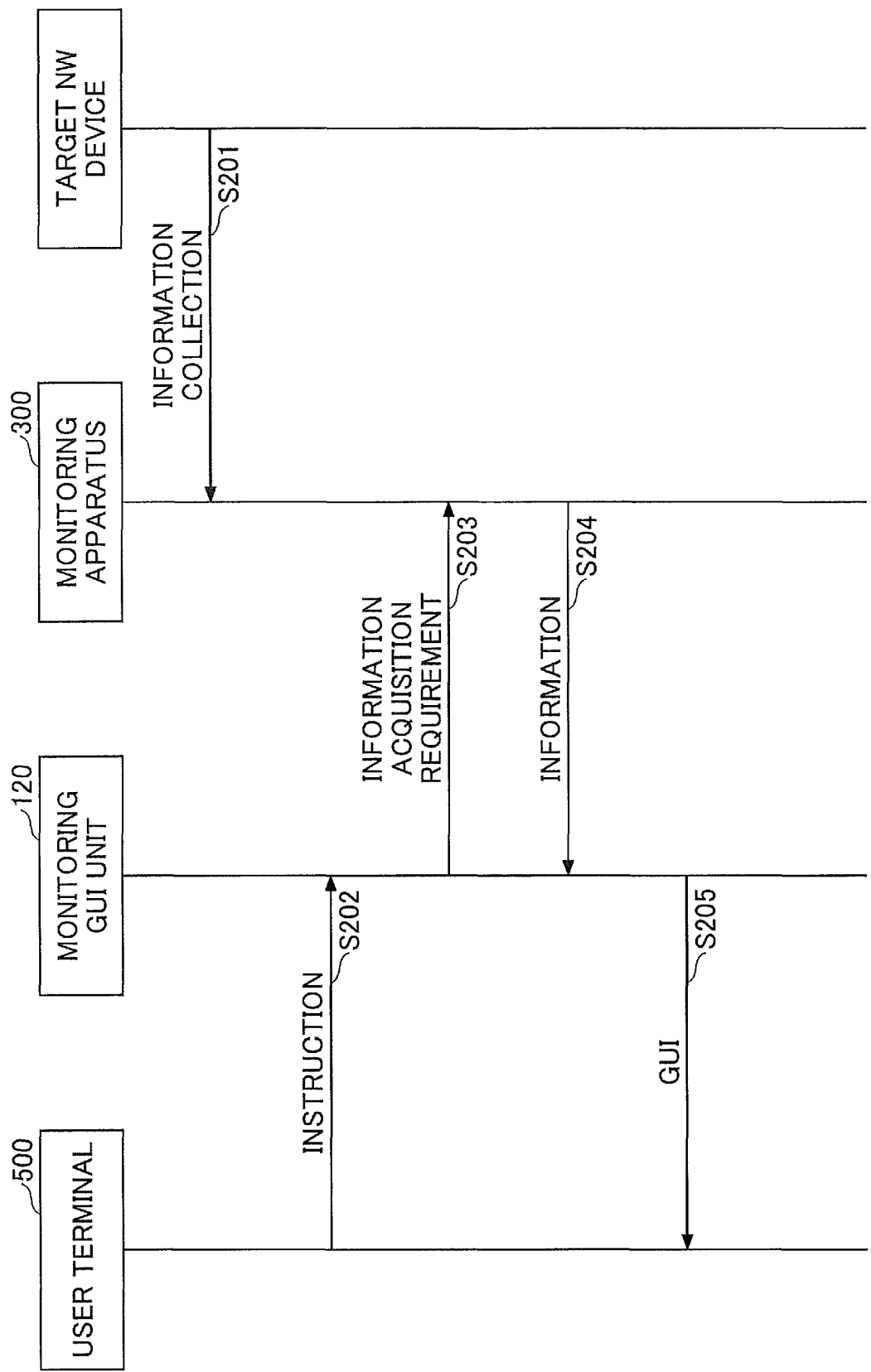
FIG. 17 is a diagram illustrating a flow of a basic process of monitoring.

FIG. 17 illustrates a sequence example in which a user views monitoring information (for example, traffic volume) of a resource (for example, connection) on a GUI screen.

In S201, the monitoring apparatus 300 collects the monitoring information from the NW device, the cloud, and the like constituting the target network 400, and stores the collected monitoring information in the monitoring database. S201 is performed periodically, for example.

For example, suppose that the user instructs to display a specific monitoring information for a specific resource via the GUI screen displayed on the user terminal 500. In S202, instruction information is transmitted from the user terminal 500 to the monitoring GUI unit 120.

Based on the instruction information, the monitoring GUI unit 120 acquires the monitoring information of the resource instructed by the user from the monitoring database of the monitoring apparatus 300 (S203 to S204).

In S205, the monitoring GUI unit 120 creates the information of the GUI screen for displaying the monitoring information of the resource instructed by the user, and displays the GUI screen on the user terminal 500.

(GUI Screen Example)

FIG. 18 to FIG. 34 illustrate examples of the GUI screen displayed on the user terminal 500 by the setting GUI unit 110 or the monitoring GUI unit 120. The screen examples illustrated in FIGS. 18 to 34 are merely examples. The display position of the elements illustrated in each screen example (for example, the buttons illustrated on the left edge) may be freely changed. The "start point" described below may be replaced by "end point", and the "end point" described below may be replaced by "start point".

Figure 18:
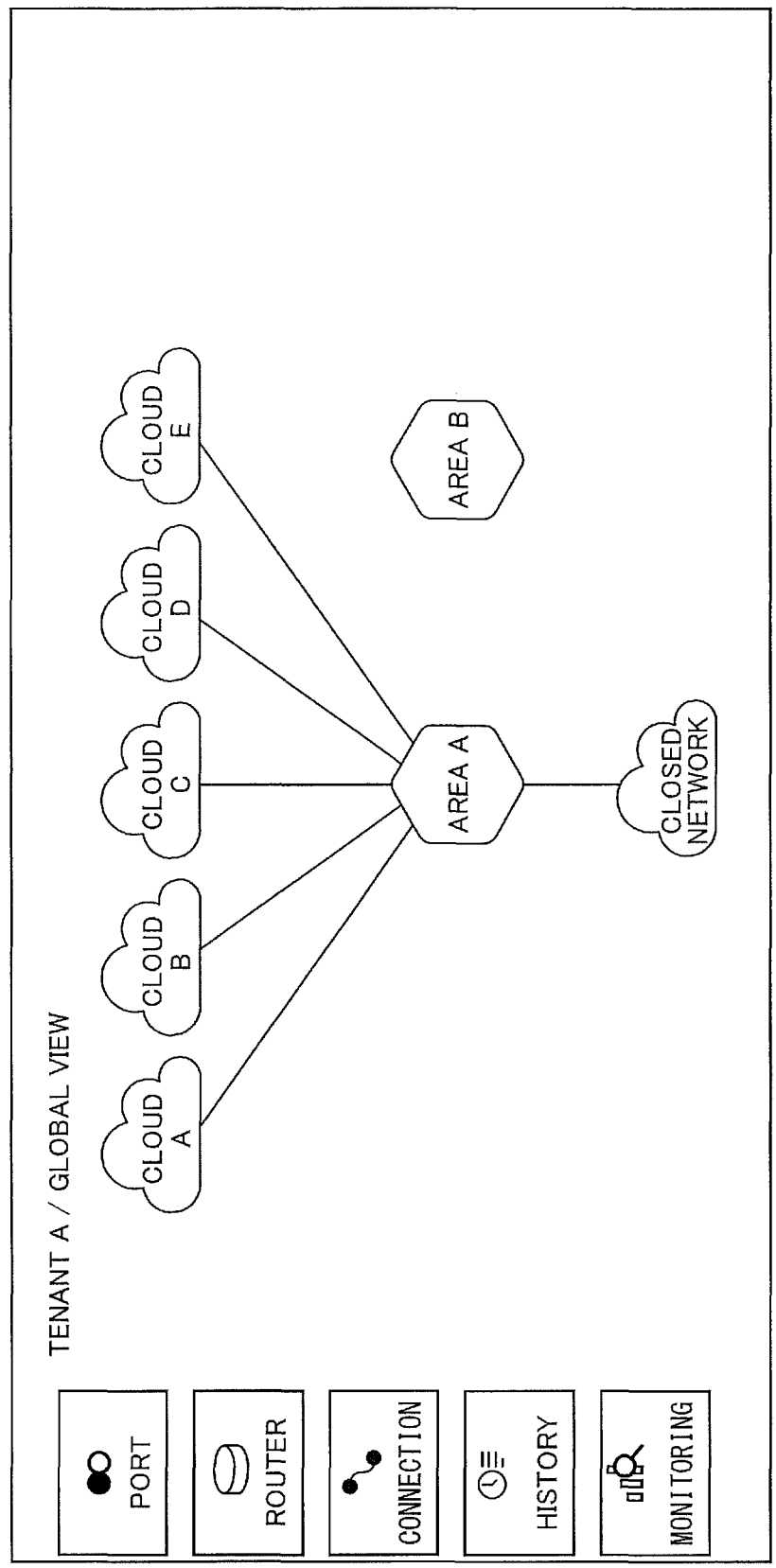
FIG. 18 is a diagram illustrating an example of a screen displayed on a user terminal.

FIG. 18 is an example of a GUI screen displayed on the user terminal 500 at the first stage of setting. FIG. 18 illustrates an area where an interconnect system exists, clouds connectable from the area, and the like. "Connectable" means that a connection can be established. In the example of FIG. 18, for example, Cloud A and Area A are connected by a line because Cloud A and Area A are connectable. "Cloud A and Area A are connectable" means that Cloud A is connected to a port of the interconnect system of Area A, and that the port is connectable to another port or router in Area A. The connection of Area A is illustrated because Tenant A belongs to Area A, although Area B is also illustrated.

In the example of FIG. 18, the connection of Area A is illustrated. It is also possible to display the connection contents of each of the plurality of areas, as illustrated in FIG. 19.

Figure 19:
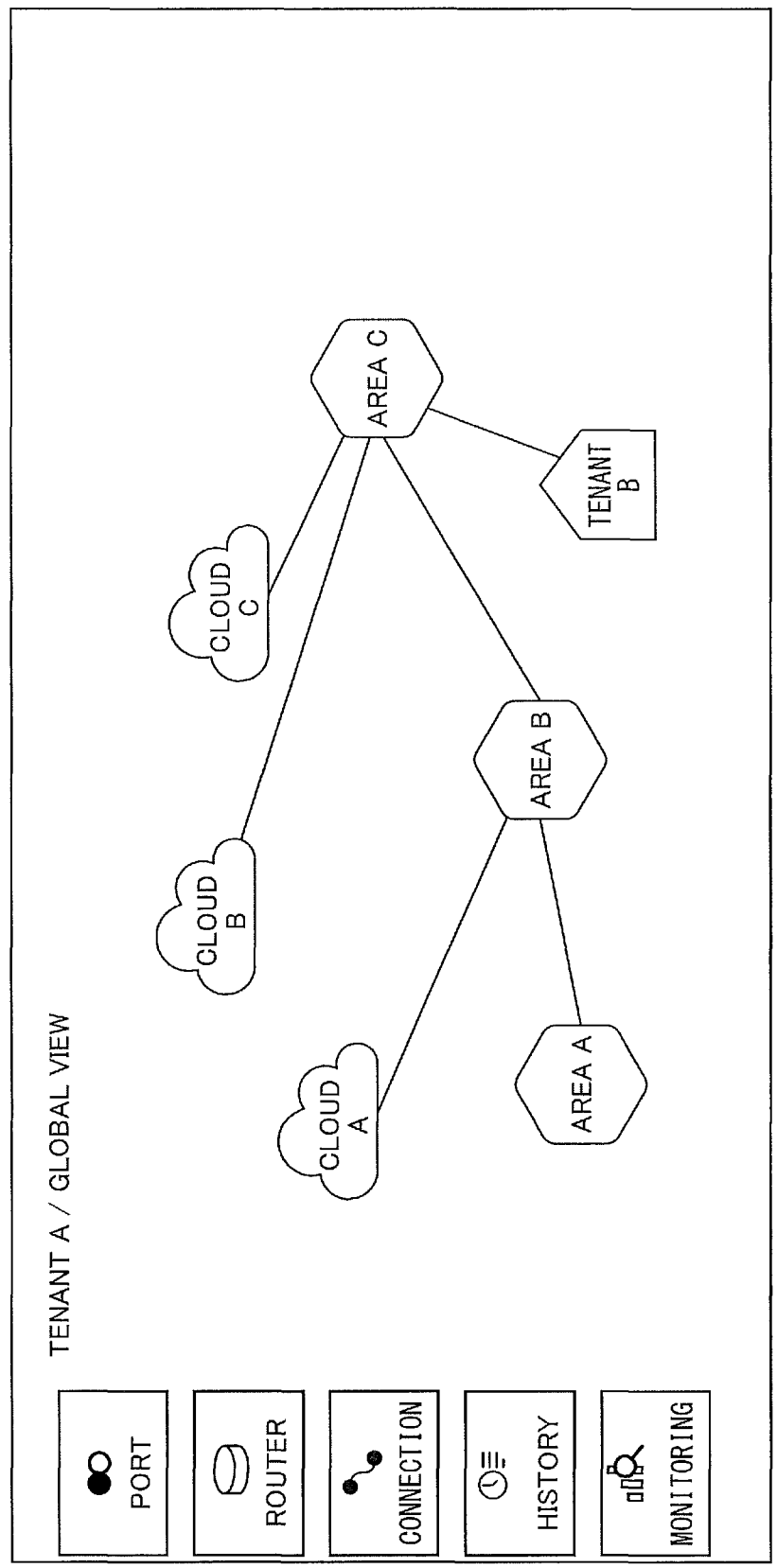
FIG. 19 is a diagram illustrating an example of a screen displayed on the user terminal.

Displaying the network configuration in which the areas and the clouds are connected by lines, as illustrated in FIGS. 18 and 19, is an example. For example, a line need not necessarily be illustrated. The target that is connected to the cloud by a line may be the point name, company name, service name, and the like, in place of the area name.

Figure 20:
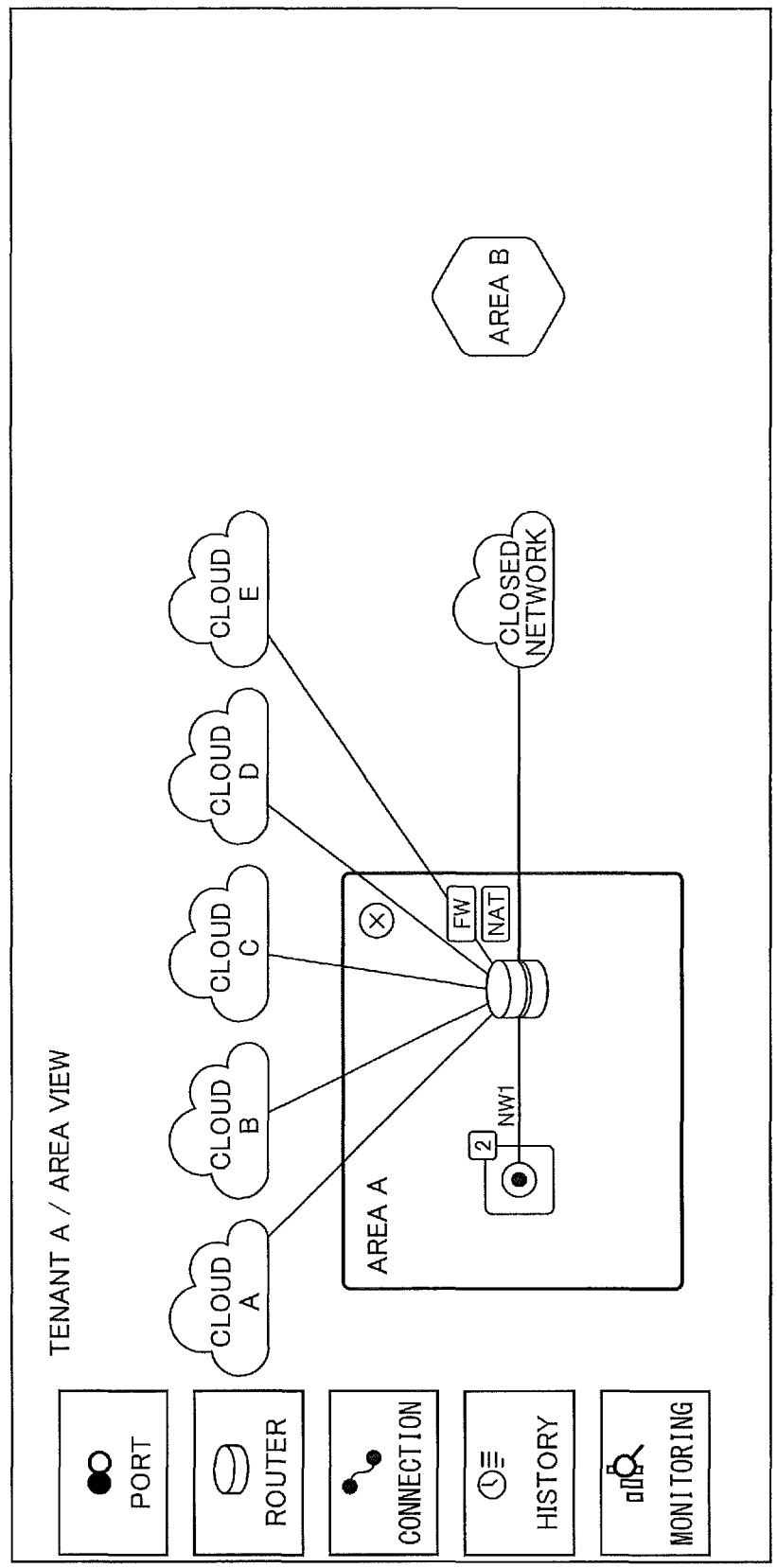
FIG. 20 is a diagram illustrating an example of a screen displayed on the user terminal.

When the user selects (clicks) the portion of Area A on the screen while the GUI screen illustrated in FIG. 18 is displayed, the GUI screen illustrated in FIG. 20 is displayed.

As illustrated in FIG. 20, an overview of the equipment in Area A is displayed in the frame representing Area A. Although FIG. 20 illustrates one location (the location indicated by "2", and the location where the port is located) as an example, a plurality of locations are typically displayed.

Figure 21:
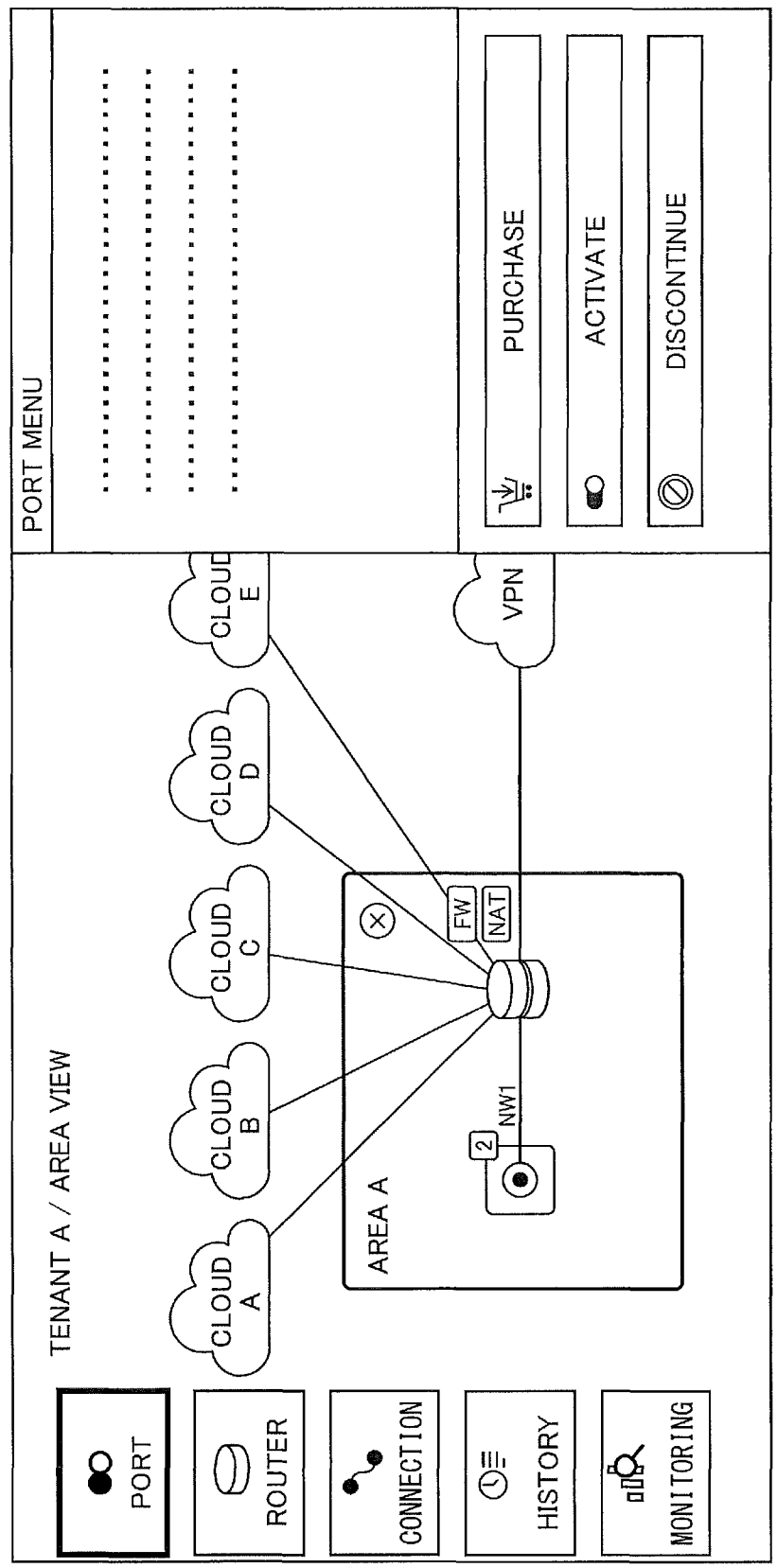
FIG. 21 is a diagram illustrating an example of a screen displayed on the user terminal.

FIGS. 21 to 24 illustrate examples of the GUI screen displayed when purchasing a port. As illustrated in FIG. 21, when the "port" button in the upper left portion of the screen is clicked, a screen for selecting to purchase, activate, or discontinue the port, is displayed in the right side. In the section above the "purchase" button, an overview explanation of the port, an explanation of a lead time (after purchasing, a request for a physical work is required), and the like are displayed.

Figure 22:
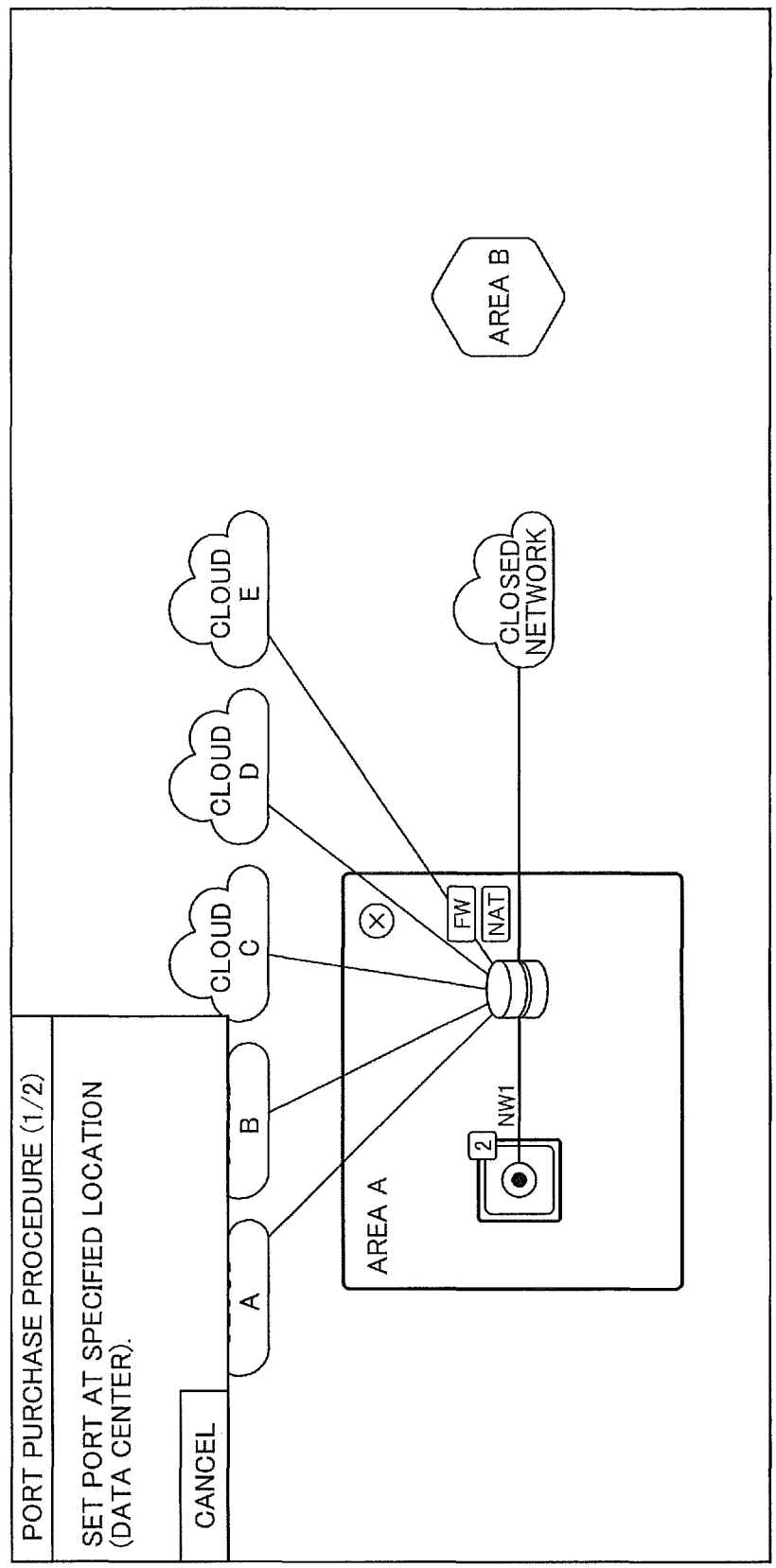
FIG. 22 is a diagram illustrating an example of a screen displayed on the user terminal.

When the user clicks "purchase", the screen illustrated in FIG. 22 is displayed. In FIG. 22, a guidance "Set port at specified location (data center)." is displayed.

When the user selects the location where "2" is written, the screen illustrated in FIG. 23 is displayed. The user selects (inputs) parameters such as band frequency, number of VLAN, switch (SW), and the like and clicks "confirm". Note that selecting a location is also selecting a port.

The LOA is then issued by the system (for example, the control apparatus 200). The user notifies the NW provider of the LOA, and, for example, the user equipment is connected to the port by an optical cable. When the user activates the port, packet transmission and reception are enabled, and the user begins being charged.

Figure 24:
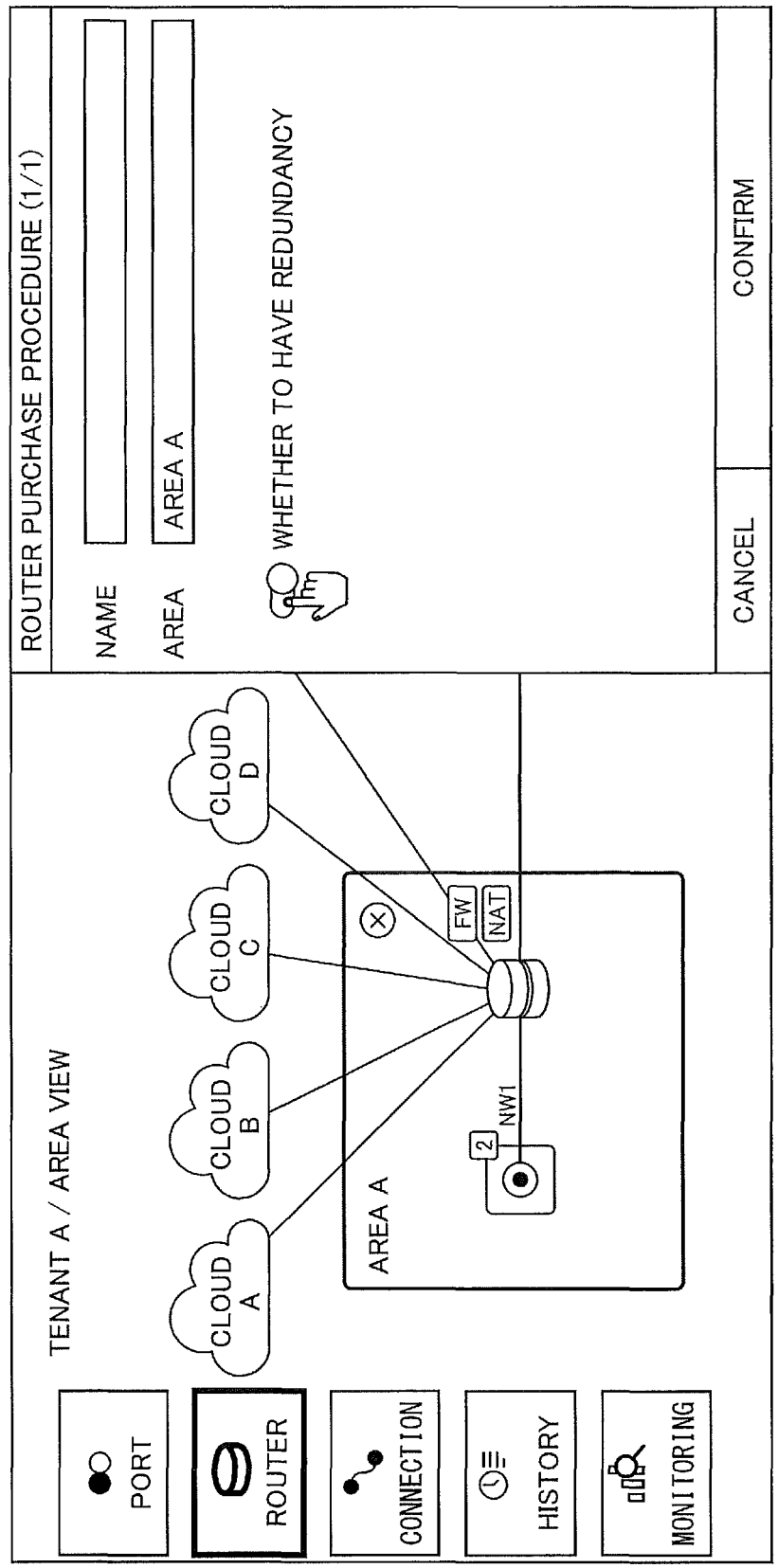
FIG. 24 is a diagram illustrating an example of a screen displayed on the user terminal.

When the user selects "router" on the left on the screen of FIG. 20, a screen is displayed where "purchase", "add-on setting", and "discontinue" can be selected. When the user selects "purchase", a screen illustrated in FIG. 24 is displayed. The user can select whether to have redundancy (one of the parameters). When there is no redundancy, a single router is purchased, and when there is redundancy, a paired router is purchased.

Figure 25:
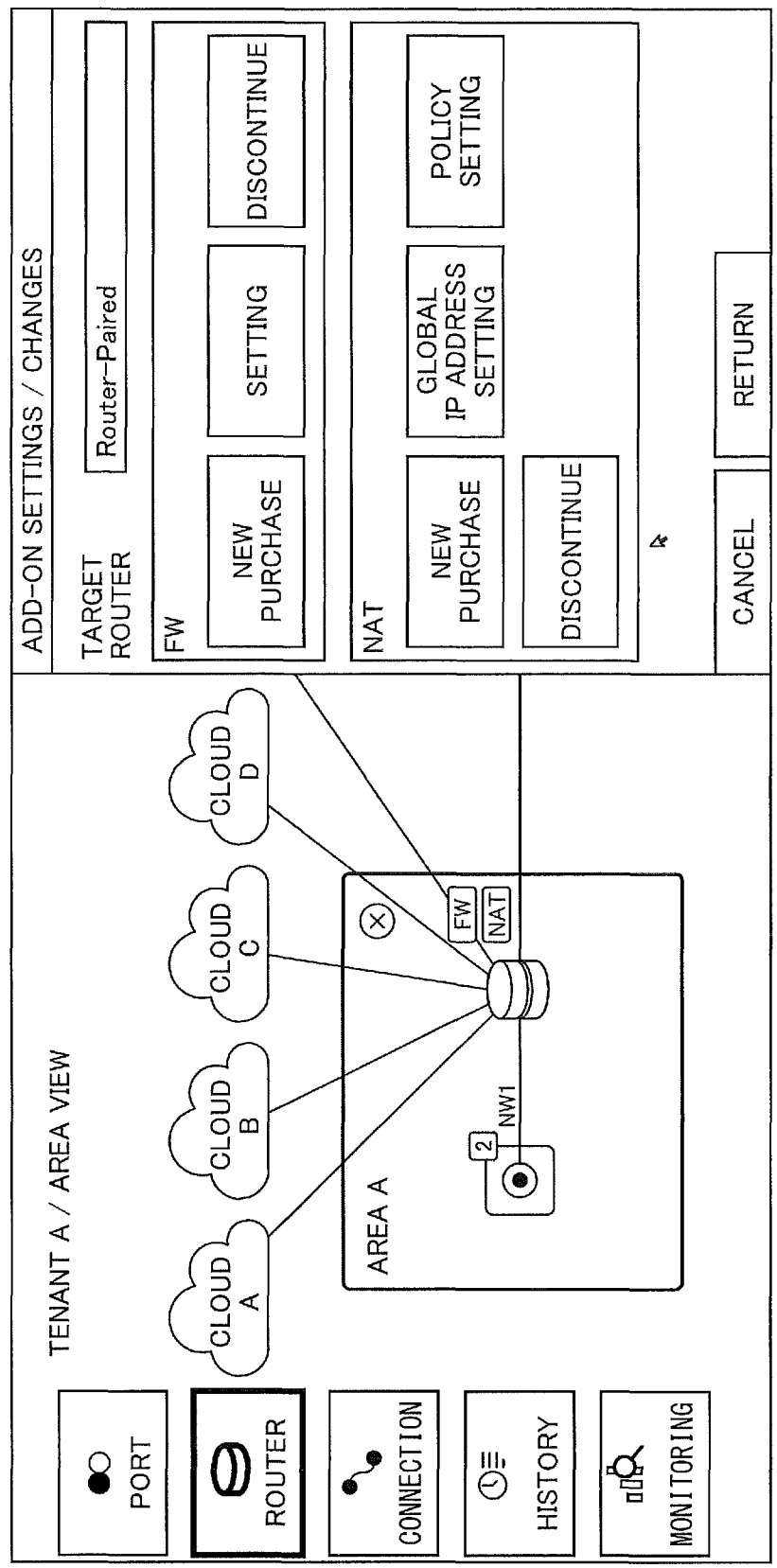
FIG. 25 is a diagram illustrating an example of a screen displayed on the user terminal.

When the user selects "router" on the left on the screen of FIG. 20, and then selects "add-on setting", the screen of FIG. 25 is displayed. As illustrated in FIG. 25, regarding FW, "new purchase", "setting", and "discontinue" can be selected, and regarding NAT, "new purchase", "global IP address setting", "policy setting", and "discontinue" can be selected.

Figure 26:
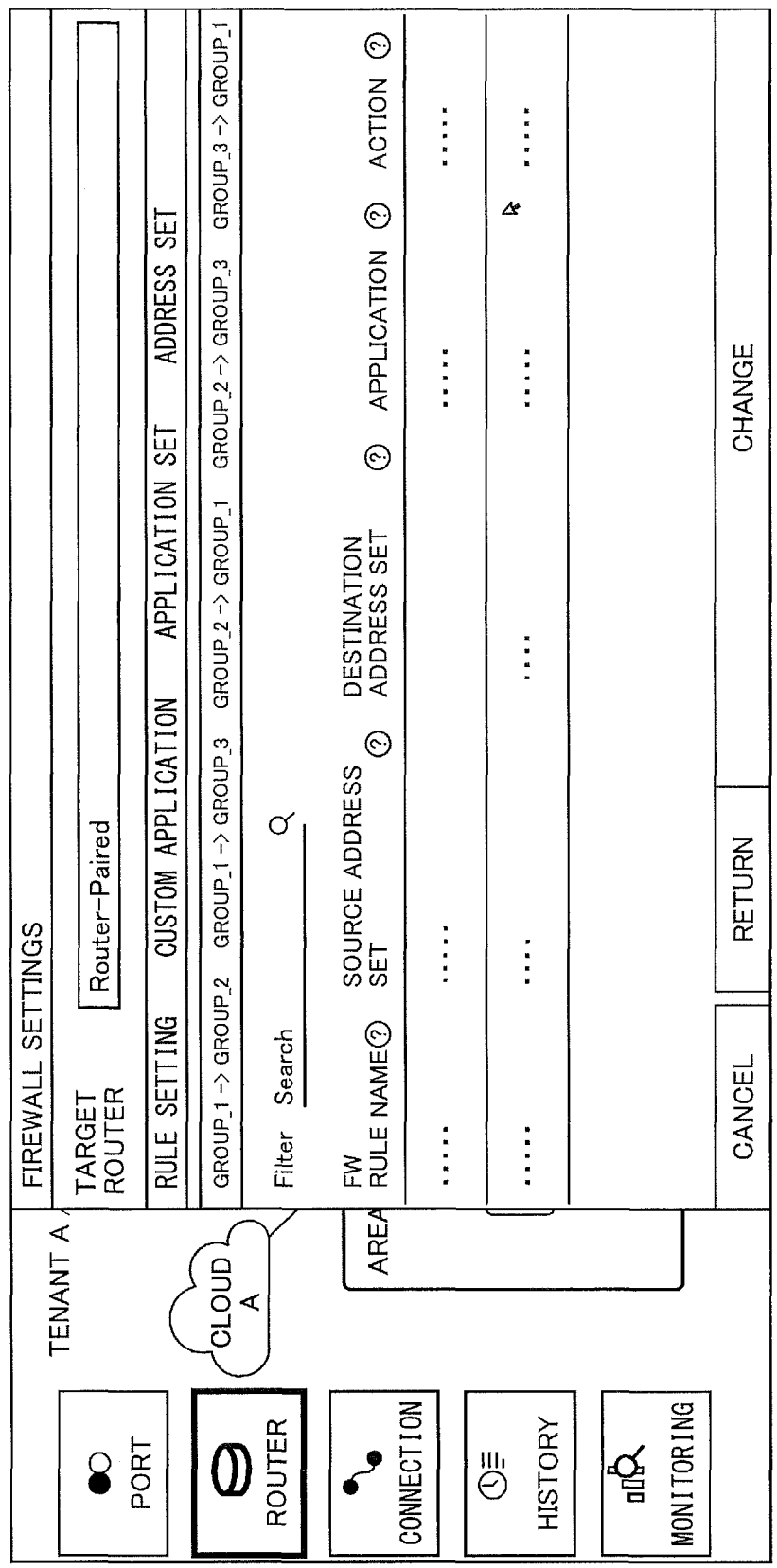
FIG. 26 is a diagram illustrating an example of a screen displayed on the user terminal.

For example, when "setting" of FW is selected, the screen illustrated in FIG. 26 is displayed. The user can perform FW settings by entering various parameters on the screen.

Figure 27:
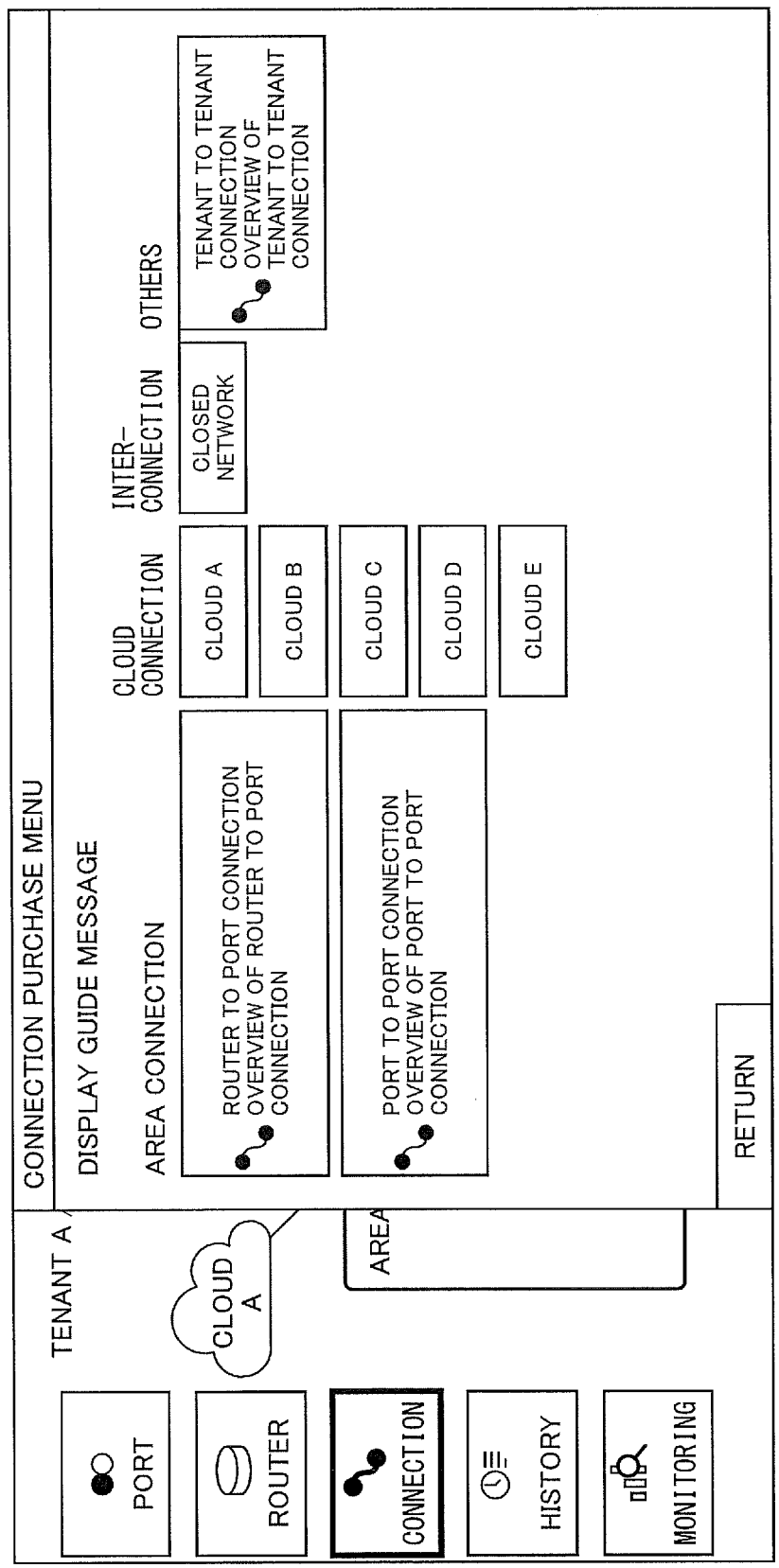
FIG. 27 is a diagram illustrating an example of a screen displayed on the user terminal.

For example, when the user selects "connection" on the left on the screen of FIG. 20, the screen of FIG. 27 is displayed. As illustrated in FIG. 27, various connection patterns are displayed so that the user can select the desired connection pattern.

For example, when the user intends to connect the user's equipment to Cloud A, the user selects "Cloud A" of cloud connections. In the present embodiment, by selecting "Cloud A", the port in the interconnect system to which "Cloud A" is connected is selected as the end point (dst). Note that, when there are multiple ports (locations) connected to Cloud A, the user may select one port (location) as the end point from among the multiple ports (locations).

Figure 28:
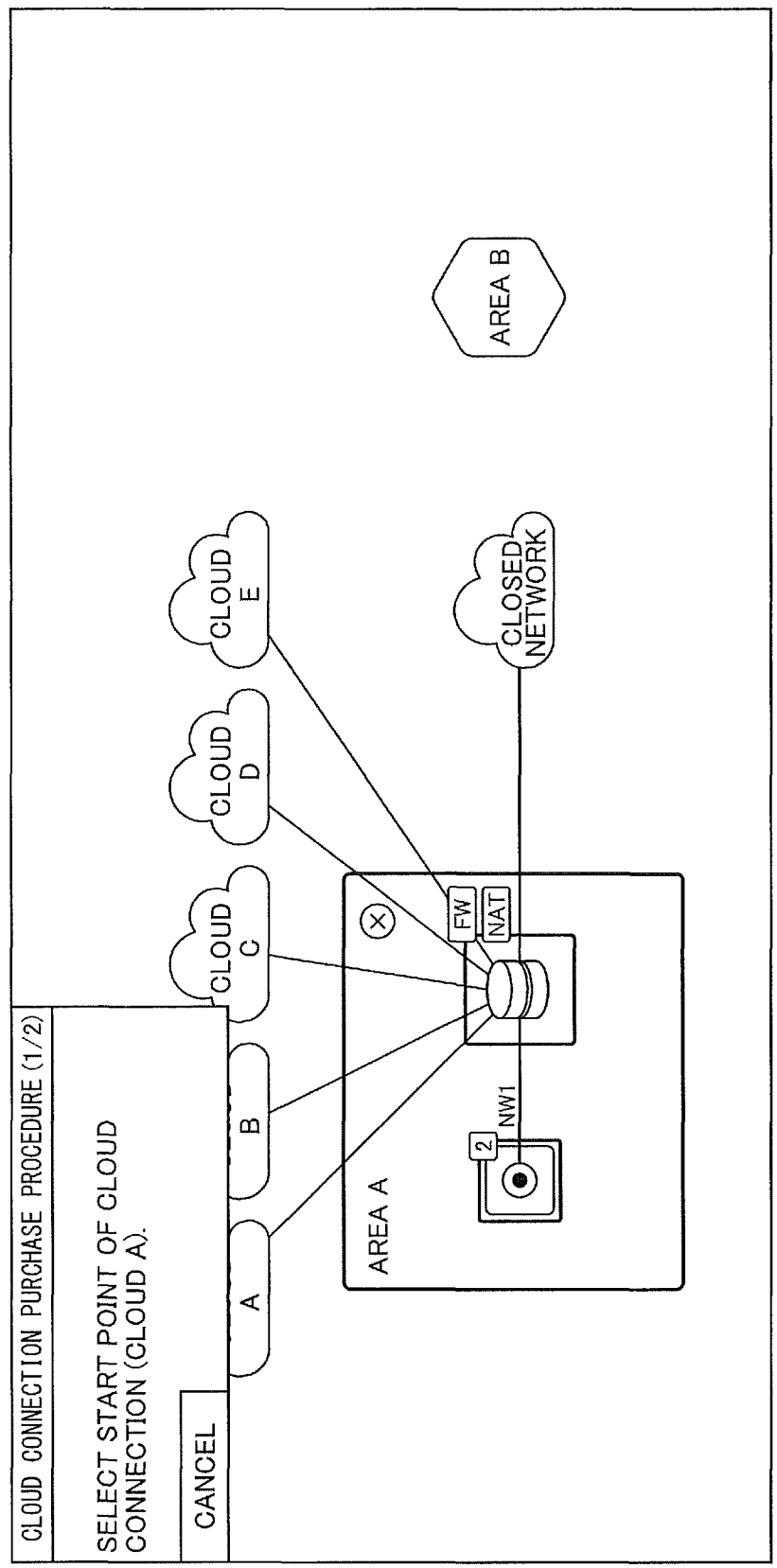
FIG. 28 is a diagram illustrating an example of a screen displayed on the user terminal.
Figure 29:
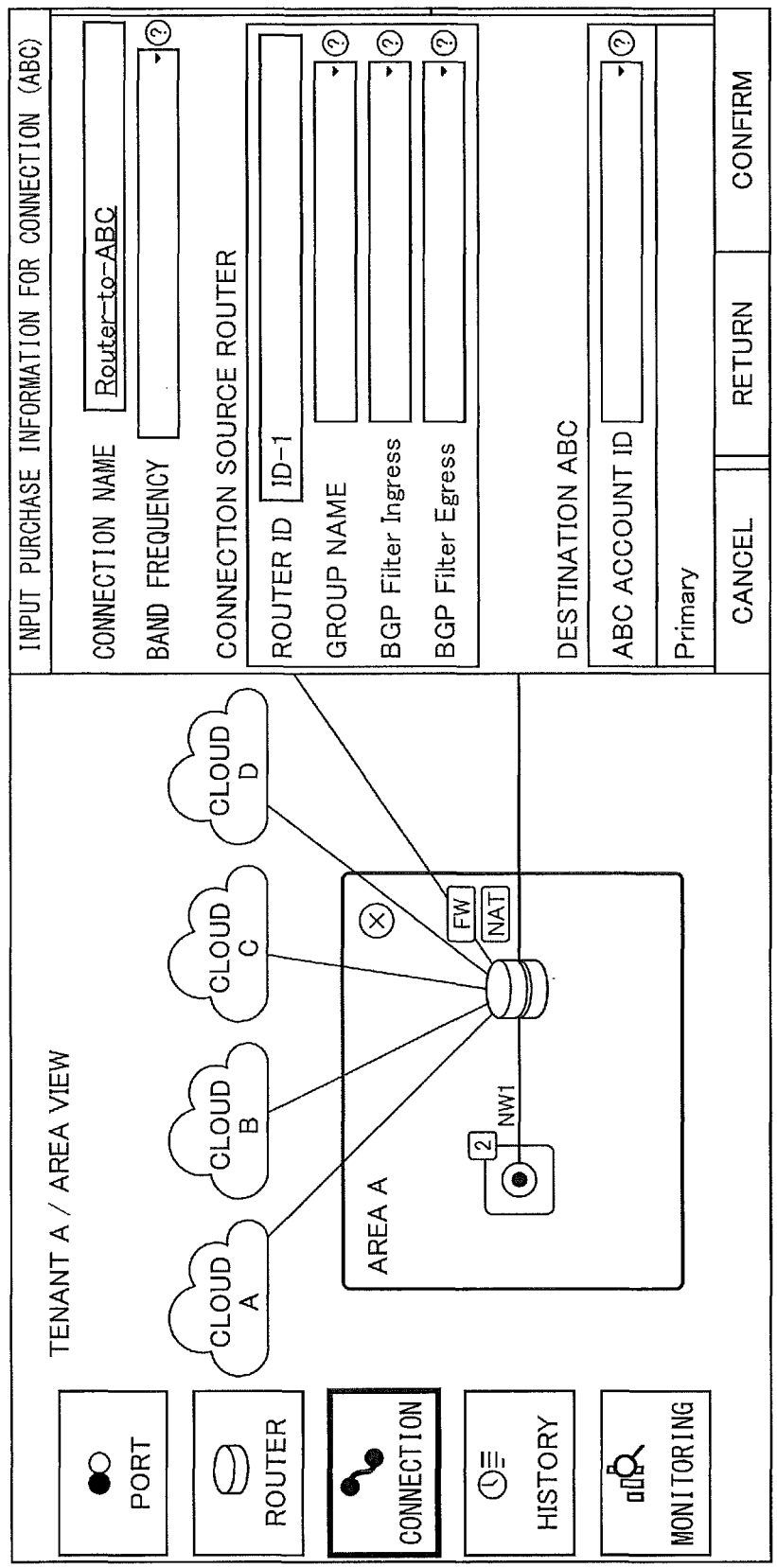
FIG. 29 is a diagram illustrating an example of a screen displayed on the user terminal.

When the user selects Cloud A, the screen illustrated in FIG. 28 is displayed. When the user selects a router (illustrated cylindrically) as the start point on the screen, a parameter input screen as illustrated in FIG. 29 is displayed. The user enters parameters such as band frequency, BGP setting information, and information for cloud connection authorization. "ABC" in FIG. 29 is the name of the cloud.

The port or router that is required to be selected at the time of purchasing "connection" may be purchased before the purchase operation of "connection", or may be purchased when required to be selected at the time of purchasing "connection".

When the user enters the parameters, and clicks "confirm", the screen showing the contents of the entered parameters is displayed. When the user clicks "purchase", the L3 connection is established.

The parameters that need to be set for the cloud connection vary from cloud to cloud. In the present embodiment, the setting GUI unit 110 or the control apparatus 200 comprehends the parameters that need to be set for each cloud. When a cloud is selected, among the parameters that need to be set for the connection to the cloud, the parameters required to be input by the user are requested to be input on the screen of FIG. 29. For other parameters, the setting GUI unit 110 or the control apparatus 200 automatically determines the parameters that need to be set for the target NW device or for the cloud, and performs the setting.

The parameter required to be input by the user is, for example, ID, key, or the like for connection authorization issued by the cloud. The parameter that is automatically determined by the system is, for example, the set band frequency of the cloud side. Such a mechanism allows users to easily connect to various clouds without searching for the parameters of each cloud.

When the user clicks "history" on the left on the screen, the previous application history (purchased resource, date and time, entered parameter, setting progress (in process, completed), and the like) is displayed and can be checked by the user. The setting progress can be determined based on whether the setting completion illustrated in FIG. 16 is received.

Figure 30:
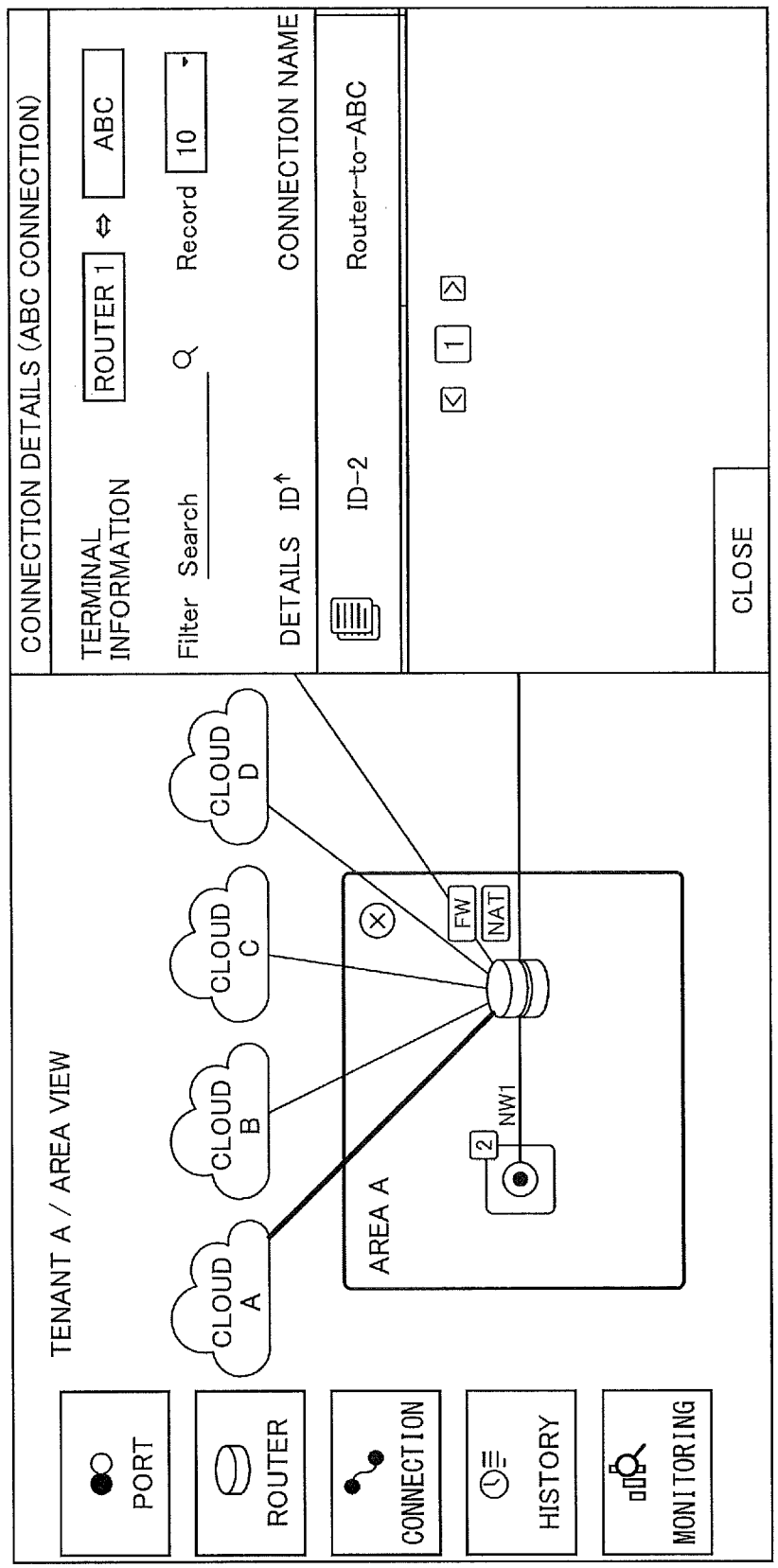
FIG. 30 is a diagram illustrating an example of a screen displayed on the user terminal.

When the user selects (clicks) portions such as a location (port), a router, a connection, and the like on the screen illustrated in FIG. 20, details of the selected portions are displayed and can be checked by the user. FIG. 30 is an example of the screen displayed when the connection between the router and Cloud A is clicked.

The examples illustrated in FIGS. 28 and 29 are examples of selecting a router as the start point for a cloud connection. When a port is selected as the start point for a cloud connection, a parameter input screen is displayed for the L2 connection, and the L2 connection is established by entering parameters.

When, for example, "router to port connection" is selected on the screen of FIG. 27, a screen is displayed for selecting a router as the start point, for example. When a router as the start point is selected, a screen is displayed for selecting a port as the end point. When a port as the end point is selected, after performing a parameter input, the L3 connection is established between the router and the port.

When, for example, "port to port connection" is selected on the screen of FIG. 27, a screen is displayed for selecting a port as the start point, for example. When a port as the start point is selected, a screen is displayed for selecting a port as the end point. When a port as the end point is selected, after performing a parameter input, the L2 connection is established between the ports.

Figure 31:
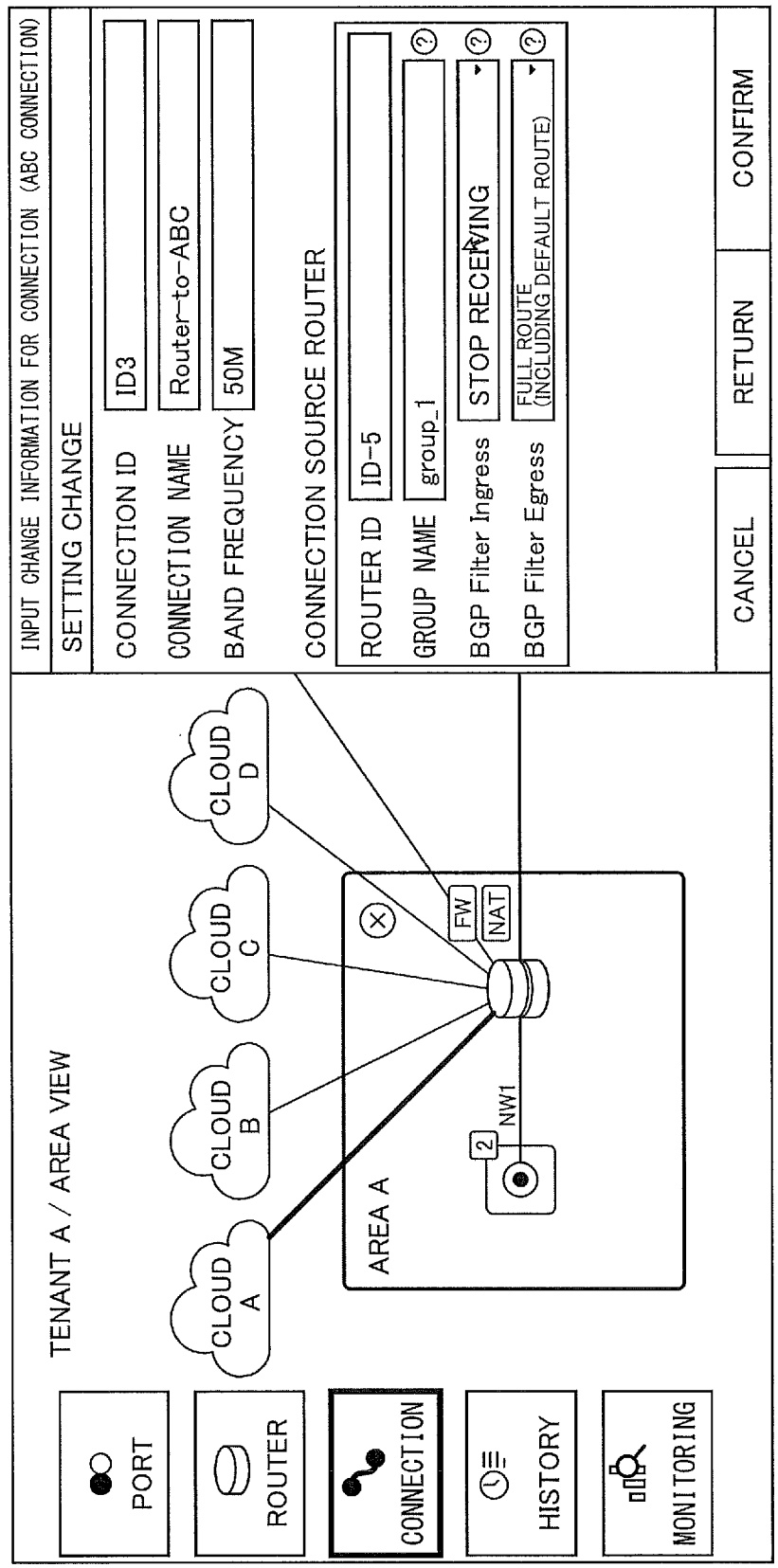
FIG. 31 is a diagram illustrating an example of a screen displayed on the user terminal.

Changes of resource settings can also be easily performed. For example, when the user selects the connection for which the user intends to change the settings on the screen, and clicks "change settings", the change settings screen illustrated in FIG. 31 is displayed. The user can change the settings by entering changed parameters and the like.

When the setting of adding or changing a resource is completed and operation is started, for example, by clicking "monitoring" at the lower left of FIG. 20 displayed by the setting GUI unit 110, the monitoring information of the user's resources is displayed on the user terminal 500. This monitoring information is displayed by the monitoring GUI unit 120. This control is performed by, for example, upon clicking "monitoring" on the screen, notifying of display instruction from the setting GUI unit 110 to the monitoring GUI unit 120.

Figure 32:
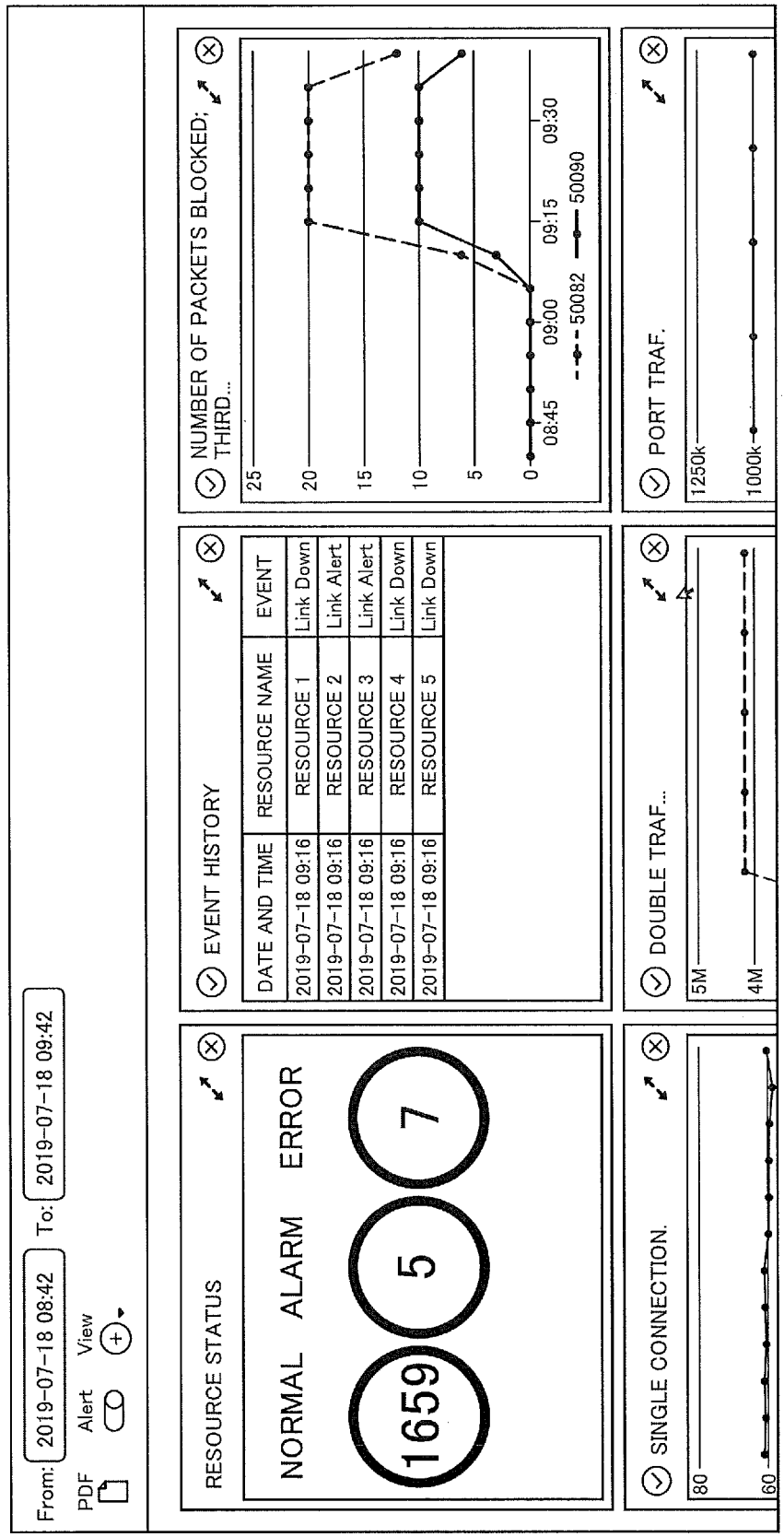
FIG. 32 is a diagram illustrating an example of a screen displayed on the user terminal.
Figure 33:
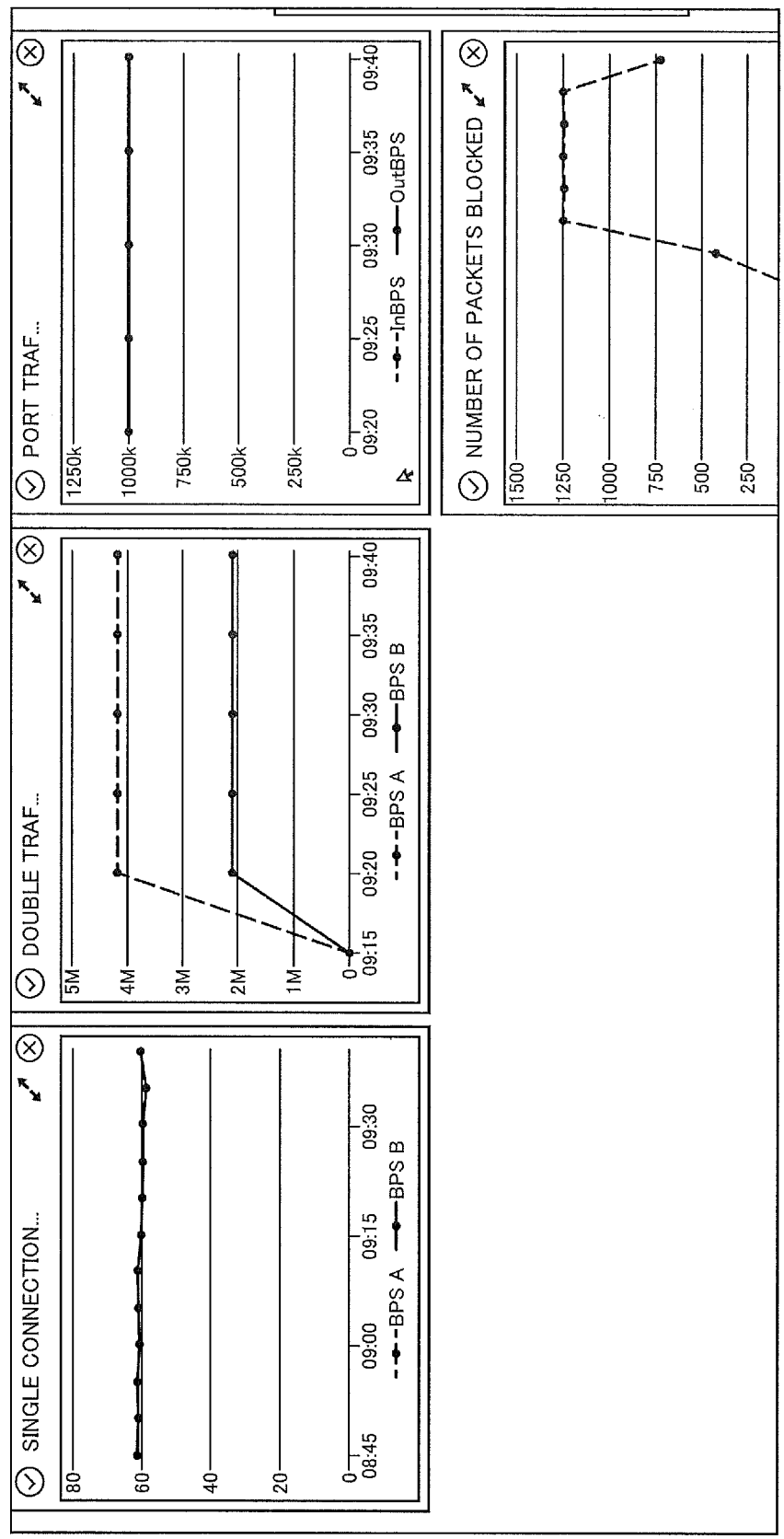
FIG. 33 is a diagram illustrating an example of a screen displayed on the user terminal.

FIGS. 32 and 33 illustrate examples of the displayed monitoring information. As illustrated in FIGS. 32 and 33, a list of resource status ("normal", "alarm", "error"), event history, number of packets blocked by FW, connection traffic, port traffic, and the like are displayed.

When the user selects a specific monitoring information from the list on the display screen, details of the specific monitoring information are displayed. FIG. 34 illustrates an example of a screen displayed when "resource status" is clicked. As illustrated in FIG. 34, the status of each resource is displayed.

(Effect of Embodiment)

According to the present embodiment described above, the connection between the desired start point and the desired end point can be easily achieved by operation on the user interface. That is, on-demand, as needed, in minutes, and without assets, cloud connection and other functions are easily available.

In addition, according to the present embodiment, a graphical user interface can be provided that enables easy construction of a desired connection configuration in the interconnection. That is, it is possible to easily grasp the connection status of the entire interconnection, such as cloud/closed network/DC/Internet. It is also possible for the user to easily select a network configuration and establish connectivity. Connection status can also be visually checked on the monitoring screen.

SUMMARY OF EMBODIMENTS

At least the network system described below are disclosed herein.

(1)
A network system including:
at least one network device; and
a control apparatus,
wherein the control apparatus receives information about a start point and an end point both selected by a user via a user interface, and transmits to the at least one network device setting information for establishing a virtual private network that connects the start point and the end point.

(2)
The network system of (1), wherein at least one of the start point or the end point is a port in a data center where a user equipment is located.

(3)
The network system of (1) or (2), wherein in a case where the start point and the end point are ports, a layer 2 virtual private network is established as the virtual private network, and in a case where at least one of the start point or the end point is a router, a layer 3 virtual private network is established as the virtual private network.

(4)
The network system of any one of (1) to (3), wherein in a case where at least one of the start point or the end point is a router, the router is a peer for a border gateway protocol (BGP) connection.

(5)
The network system of any one of (1) to (3), wherein in a case where at least one of the start point or the end point is a router, the router includes at least one virtual router that composes at least one routing group.

(6)
The network system of (5), wherein in a case where an addition of a component is instructed by the user via the user interface, the component is added between one routing group and another routing group.

(7)
The network system of (6), wherein the component is a firewall, a network address translation (NAT), or, the firewall and the NAT.

At least the display control system, the method for displaying, and the program described below are disclosed herein.

(1)
A display control system for displaying a GUI screen on a terminal of a user, the display control system comprising:
a setting GUI unit,
wherein the setting GUI unit is configured to cause the terminal to display a screen depicting a network configuration including a plurality of selectable clouds, and
wherein the setting GUI unit is configured to cause the terminal to display a parameter input screen for a connection between a specific cloud and a resource in a case where the specific cloud and the resource to connect to the specific cloud are selected at the terminal.

(2) The display control system of (1), wherein the setting GUI unit is configured to cause the terminal to display a screen for selecting an additional function for the resource, and in a case where a specific additional function is selected at the terminal, the setting GUI unit is configured to cause the terminal to display a parameter input screen for the specific additional function.

(3) The display control system of (1) or (2), wherein the setting GUI unit is configured to transmit a parameter input via the parameter input screen to a control apparatus, the control apparatus being configured to perform setting of at least one network device.

(4) The display control system of (3), wherein the setting GUI unit is configured to cause the terminal to display a history including a setting status for the at least one network device.

(5) The display control system of any one of (1) to (4), further comprising a monitoring GUI unit that is configured to cause the terminal to display a screen depicting monitoring information regarding the resource set by the user.

(6) The display control system of (5), wherein the monitoring GUI unit is configured to cause the terminal to display the screen depicting the monitoring information in accordance with an instruction by the user via the screen displayed on the terminal by the setting GUI unit.

(7) A method for displaying that is performed by a display control system for displaying a GUI screen on a terminal of a user, the method for displaying comprising:
causing the terminal to display a screen depicting a network configuration including a plurality of selectable clouds, and causing, in a case where a specific cloud and a resource to connect to the specific cloud are selected at the terminal, the terminal to display a parameter input screen for a connection between the specific cloud and the resource.

(8) A program for causing a computer to function as:
the setting GUI unit of any one of (1) to (6).

(9) A program for causing a computer to function as:
the monitoring GUI unit of (5) or (6).

The present embodiment has been described above. The present invention is not limited to the specific embodiments, and various modifications and changes are possible within the scope of the present invention as claimed.

10 router
20 add-on component
30 leaf
60 core
100 display control system
110 setting GUI unit
120 monitoring GUI unit
200 control apparatus
300 monitoring apparatus
500 user terminal
1000 drive device
1002 auxiliary storage device
1003 memory device
1004 CPU
1005 interface device
1006 display device
1007 input device

What is claimed is:

1. A display control system for displaying a graphical user interface (GUI) screen on a terminal of a user, the display control system comprising:
a memory; and
a processor coupled to the memory and configured to:
cause the terminal to display a network configuration including a plurality of selectable clouds on the GUI screen,
cause the terminal to display, on the GUI screen, a connection configuration between a specific cloud and a resource in a case where the specific cloud and the resource to connect to the specific cloud are selected at the terminal, and display a parameter input screen in response to selection of a start point for a cloud connection by the user on the GUI screen, the parameter input screen overlapping the GUI screen and displaying a parameter required to be input by the user thereon to establish the cloud connection to the specific cloud selected by the user from the plurality of selectable clouds, and
automatically determine other parameters that need to be set for the cloud connection to the specific cloud,
wherein the GUI screen is configured to allow the user to select a router or a port as the resource, and
wherein the processor is configured to establish an L2 connection in a case where the user selects the port for both of the start point and an end point for the cloud connection, and establish an L3 connection in a case where the user selects the router for the start point or the end point for the cloud connection.

2. The display control system according to claim 1, wherein the processor is configured to cause the terminal to display, on the GUI screen, an additional function to be selected for the resource, and in a case where a specific additional function is selected at the terminal, the processor is configured to cause the terminal to display the parameter input screen for the specific additional function.

3. The display control system according to claim 1, wherein the processor is configured to transmit a parameter input via the parameter input screen to a control apparatus, the control apparatus being configured to perform setting of at least one network device.

4. The display control system according to claim 3, wherein the processor is configured to cause the terminal to display a history including a setting status for the at least one network device.

5. The display control system according to claim 1, wherein the processor is further configured to cause the terminal to display monitoring information regarding the resource set by the user.

6. The display control system according to claim 5, wherein the processor is configured to cause the terminal to display the monitoring information in accordance with an instruction by the user via the GUI screen displayed on the terminal.

7. The display control system according to claim 1,
wherein the parameter required to be input by the user includes information for connection authorization issued by the specific cloud, and
wherein the other parameters automatically determined include set band frequency of the specific cloud.

8. The display control system according to claim 1, wherein
the processor is configured to cause the terminal to display a port button, a router button, and a connection button on a first side of the GUI screen,
in a case where the port button is selected, a port menu for selecting to purchase, activate, or discontinue a port is displayed on a second side of the GUI screen,
in a case where the router button is selected, a router menu for selecting to purchase, set add-on, and discontinue a router is displayed on the second side of the GUI screen, and
in a case where the connection button is selected, a connection menu for selecting a plurality of connection patterns is displayed on the second side of the GUI screen, the plurality of connection patterns including a router-to-port connection, a port-to-port connection, and the cloud connection.

9. A method for displaying that is performed by a display control system for displaying a graphical user interface (GUI) screen on a terminal of a user, the method for displaying comprising:
causing the terminal to display a network configuration including a plurality of selectable clouds on the GUI screen,
causing, in a case where a specific cloud and a resource to connect to the specific cloud are selected at the terminal, the terminal to display, on the GUI screen, a connection configuration between the specific cloud and the resource, and display a parameter input screen in response to selection of a start point for a cloud connection by the user on the GUI screen, the parameter input screen overlapping the GUI screen and displaying a parameter required to be input by the user thereon to establish the cloud connection to the specific cloud selected by the user from the plurality of selectable clouds, and
automatically determining other parameters that need to be set for the cloud connection to the specific cloud,
wherein the GUI screen is configured to allow the user to select a router or a port as the resource, and
wherein an L2 connection is established in a case where the user selects the port for both of the start point and an end point for the cloud connection, and an L3 connection is established in a case where the user selects the router for the start point or the end point for the cloud connection.

10. A non-transitory computer-readable recording medium having a program embodied therein for causing a computer to:
cause a terminal of a user to display a network configuration including a plurality of selectable clouds on a graphical user interface (GUI) screen,
cause the terminal to display, on the GUI screen, a connection configuration between a specific cloud and a resource in a case where the specific cloud and the resource to connect to the specific cloud are selected at the terminal, and display a parameter input screen in response to selection of a start point for a cloud connection by the user on the GUI screen, the parameter input screen overlapping the GUI screen and displaying a parameter required to be input by the user thereon to establish the cloud connection to the specific cloud selected by the user from the plurality of selectable clouds, and
automatically determine other parameters that need to be set for the cloud connection to the specific cloud,
wherein the GUI screen is configured to allow the user to select a router or a port as the resource, and
wherein an L2 connection is established in a case where the user selects the port for both of the start point and an end point for the cloud connection, and an L3 connection is established in a case where the user selects the router for the start point or the end point for the cloud connection.

11. The non-transitory computer-readable recording medium as claimed in claim 10, wherein the program further causes the computer to
cause the terminal to display monitoring information regarding the resource set by the user.

* * * * *